(12) United States Patent
Fukawa

(10) Patent No.: US 11,120,833 B1
(45) Date of Patent: Sep. 14, 2021

(54) MAGNETIC DISK DEVICE CONFIGURED TO WRITE DATA ACCORDING TO NORMAL RECORDING AND MODIFIED SHINGLED RECORDING FORMATS

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Kiyotaka Fukawa, Hiratsuka Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/942,657

(22) Filed: Jul. 29, 2020

(30) Foreign Application Priority Data

Mar. 6, 2020 (JP) .............................. JP2020-038796

(51) Int. Cl.
*G11B 20/12* (2006.01)
*G11B 5/596* (2006.01)
*G11B 20/18* (2006.01)

(52) U.S. Cl.
CPC .......... *G11B 20/1258* (2013.01); *G11B 5/596* (2013.01); *G11B 20/1816* (2013.01); *G11B 2020/1259* (2013.01); *G11B 2020/183* (2013.01)

(58) Field of Classification Search
None
See application file for complete search history.

(56) References Cited

U.S. PATENT DOCUMENTS

| | | | |
|---|---|---|---|
| 7,082,007 B2 | 7/2006 | Liu et al. | |
| 8,559,121 B2* | 10/2013 | Saito ...................... | G11B 5/012 360/13 |
| 8,867,161 B2 | 10/2014 | Emo et al. | |
| 9,508,370 B1* | 11/2016 | Zhu ..................... | G11B 5/59627 |
| 9,607,633 B1* | 3/2017 | Toribio .............. | G11B 20/1217 |
| 9,934,805 B1* | 4/2018 | Tsukahara .......... | G11B 20/1217 |
| 10,056,109 B2 | 8/2018 | Liu et al. | |
| 10,141,013 B1* | 11/2018 | Aoki .................. | G11B 20/1217 |
| 10,607,645 B1* | 3/2020 | Hamaguchi ........ | G11B 5/59688 |
| 10,699,745 B1* | 6/2020 | Ide ..................... | G11B 5/59627 |
| 10,957,343 B1* | 3/2021 | Tomoda ............. | G11B 5/59605 |
| 10,957,345 B2* | 3/2021 | Tomoda ............... | G11B 5/1278 |

(Continued)

FOREIGN PATENT DOCUMENTS

| | | |
|---|---|---|
| JP | 2009-245577 A | 10/2009 |
| JP | 5781010 B2 | 9/2015 |
| JP | 2019-046518 A | 3/2019 |

*Primary Examiner* — Tan X Dinh
(74) *Attorney, Agent, or Firm* — Kim & Stewart LLP

(57) ABSTRACT

A magnetic disk device includes a disk including a plurality of areas divided in a radial direction, a head, and a controller configured to control the head to write data to a first area including a plurality of tracks that are separated from each other, and a second area including at least two adjacent tracks that partially overlap. A first distance between track centers of said two adjacent tracks in the radial direction is different from a second distance between track centers of another two adjacent tracks in the second area in the radial direction.

20 Claims, 18 Drawing Sheets

(56) References Cited

U.S. PATENT DOCUMENTS

| | | |
|---|---|---|
| 2009/0244775 A1 | 10/2009 | Ehrlich |
| 2013/0318295 A1 | 11/2013 | Kojima |
| 2016/0155471 A1* | 6/2016 | Pantel .................... G11B 20/20 360/47 |
| 2019/0066715 A1* | 2/2019 | Aoki .................. G11B 20/1217 |
| 2021/0090606 A1* | 3/2021 | Tomoda .................. G11B 5/09 |

* cited by examiner

FIG. 14

| ZONE BOUNDARY | | ZONE | BAND | NUMBER OF RETRIES |
|---|---|---|---|---|
| ⋮ | ⋮ | ⋮ | ⋮ | ⋮ |
| ZB0 | OUTWARD DIRECTION | Z0 | BA0n | 10 |
| | INWARD DIRECTION | Z1 | BA10 | 10 |
| ZB1 | OUTWARD DIRECTION | Z1 | BA1n | 0 |
| | INWARD DIRECTION | Z2 | BA20 | 0 |
| ⋮ | ⋮ | ⋮ | ⋮ | ⋮ |

| ZONE BOUNDARY | | ZONE | BAND | NUMBER OF RETRIES |
|---|---|---|---|---|
| ⋮ | ⋮ | ⋮ | ⋮ | ⋮ |
| ZB0 | OUTWARD DIRECTION | Z0 | BA0n | 0 |
| | INWARD DIRECTION | Z1 | BA10 | 10 |
| ZB1 | OUTWARD DIRECTION | Z1 | BA1n | 0 |
| | INWARD DIRECTION | Z2 | BA20 | 0 |
| ⋮ | ⋮ | ⋮ | ⋮ | ⋮ |

| ZONE | BAND AREA | NUMBER OF RETRIES OF INNERMOST BAND TRACK | NUMBER OF RETRIES OF OUTERMOST BAND TRACK |
|---|---|---|---|
| ⋮ | ⋮ | ⋮ | ⋮ |
| Z0 | BA00 | 0 | 5 |
| | BA01 | 5 | 0 |
| | ⋮ | ⋮ | ⋮ |
| | BA0(n-1) | 0 | 0 |
| | BA0n | 0 | 0 |
| Z1 | BA10 | 0 | 0 |
| | BA11 | 0 | 0 |
| | ⋮ | ⋮ | ⋮ |
| | BA1(n-1) | 0 | 0 |
| | BA1n | 0 | 0 |
| ⋮ | ⋮ | ⋮ | ⋮ |

TB2

| ZONE | BAND AREA | NUMBER OF RETRIES OF INNERMOST BAND TRACK | NUMBER OF RETRIES OF OUTERMOST BAND TRACK |
|---|---|---|---|
| ⋮ | ⋮ | ⋮ | ⋮ |
| Z0 | BA00 | 0 | 0 |
| | BA01 | 5 | 0 |
| | ⋮ | ⋮ | ⋮ |
| | BA0(n-1) | 0 | 0 |
| | BA0n | 0 | 0 |
| Z1 | BA10 | 0 | 0 |
| | BA11 | 0 | 0 |
| | ⋮ | ⋮ | ⋮ |
| | BA1(n-1) | 0 | 0 |
| | BA1n | 0 | 0 |
| ⋮ | ⋮ | ⋮ | ⋮ |

MAGNETIC DISK DEVICE CONFIGURED TO WRITE DATA ACCORDING TO NORMAL RECORDING AND MODIFIED SHINGLED RECORDING FORMATS

CROSS-REFERENCE TO RELATED APPLICATION

This application is based upon and claims the benefit of priority from Japanese Patent Application No. 2020-038796, filed Mar. 6, 2020, the entire contents of which are incorporated here by reference.

FIELD

Embodiments described herein relate generally to a magnetic disk device and a write processing method.

BACKGROUND

In recent years, techniques for increasing recording density of magnetic disk drives have been developed. One of such techniques is shingled write magnetic recording (SMR) or shingled write recording (SWR) in which data is written such that tracks that are adjacent in a radial direction of a disk partially overlap each other. There is a known magnetic disk device that can switch between a SMR-type recording and a conventional magnetic recording (CMR) (a non-SMR-type) in which a plurality of tracks are written at predetermined intervals along the radial direction of a disk.

DESCRIPTION OF THE DRAWINGS

FIG. 14 is a diagram illustrating a table for storing the number of retries according to the second embodiment.

FIG. 15 is a diagram illustrating a table for storing the number of retries according to the second embodiment.

FIG. 21 is a diagram illustrating a table TB2 for storing the number of retries according to a third embodiment.

DETAILED DESCRIPTION

Embodiments provide a magnetic disk device and a write processing method that is capable of improving reliability.

In general, according to one embodiment, a magnetic disk device includes a disk including a plurality of areas divided in a radial direction, a head, and a controller. The controller is configured to control the head to write data to a first area including a plurality of tracks that are separated from each other, and a second area including at least two adjacent tracks that partially overlap. A first distance between track centers of said two adjacent tracks in the radial direction is different from a second distance between track centers of another two adjacent tracks in the second area in the radial direction.

Hereinafter, certain example embodiments will be described with reference to drawings. The drawings are merely examples and do not limit the scope of the present disclosure.

First Embodiment

Figure 1:
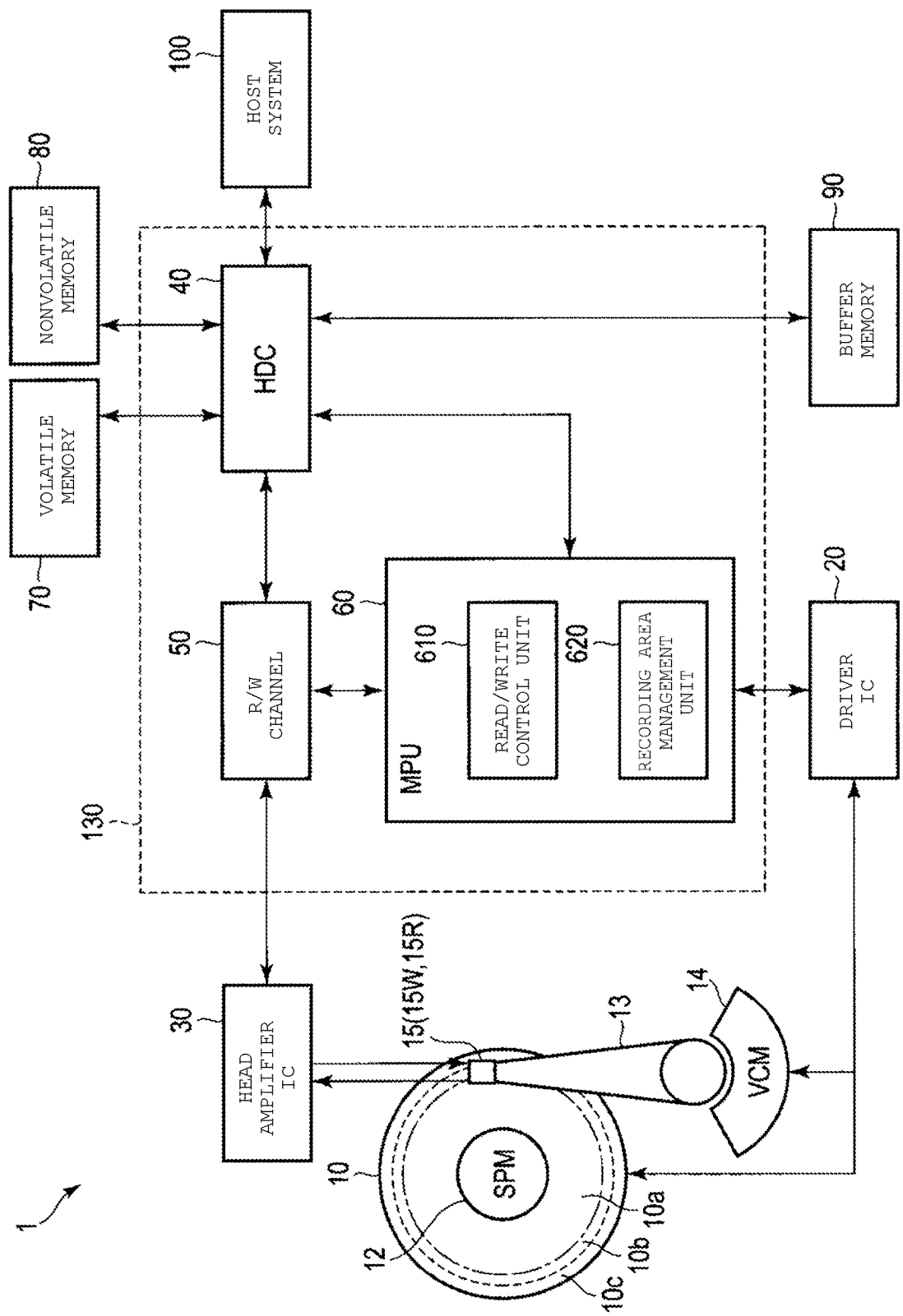
FIG. 1 is a block diagram illustrating a magnetic disk device according to a first embodiment.

FIG. 1 is a block diagram illustrating a magnetic disk device 1 according to a first embodiment.

A magnetic disk device 1 includes a head disk assembly (HDA) described later, a driver IC 20, a head amplifier integrated circuit (hereinafter, referred to as a "head amplifier IC" or "preamplifier") 30, a volatile memory 70, a nonvolatile memory 80, a buffer memory (hereinafter, referred to as a "buffer") 90, and a system controller 130 which is a one-chip integrated circuit. The magnetic disk device 1 is connected to a host system (hereinafter, simply referred to as a host) 100.

The HDA includes a magnetic disk (hereinafter, referred to as a disk) 10, a spindle motor (SPM) 12, an arm 13 on which a head 15 is mounted, and a voice coil motor (VCM) 14. The disk 10 is attached to the SPM 12 and is rotated by the SPM 12. The arm 13 and the VCM 14 make up an actuator. The actuator controls the movement of the head 15 mounted on the arm 13 to a particular position on the disk 10 by driving the VCM 14. Two or more disks 10 and heads 15 may be provided.

The disk 10 includes a user data area 10a available for the user, a media cache 10b (sometimes referred to as a media cache area) that temporarily stores data (or commands) transferred from a host or the like before writing the data in a particular area of the user data area 10a, and a system area 10c for writing information necessary for system management. A direction from the inner circumference to the outer circumference of the disk 10, and likewise a direction from the outer circumference to the inner circumference of the disk 10, is referred to as a radial direction. In this context, the (radial) direction from the inner circumference to the outer circumference is referred to as an outward direction, and a (radial) direction from the outer circumference to the inner circumference is referred to as an inward direction. The direction orthogonal to the radial direction of the disk 10 is referred to a circumferential direction. The circumferential direction corresponds to a direction along the circumference of the disk 10. Further, a certain position along the radial direction of the disk 10 may be referred to as a radial position, and a certain position along the circumferential direction of the disk 10 may be referred to as a circumferential position. The radial position and the circumferential position may be collectively referred to as a position.

The disk 10 is divided into a plurality of areas (which may be referred to as zones or zone areas) for predetermined ranges in the radial direction. A zone can be divided into a plurality of sub-areas (which may be referred to as band areas) in the radial direction. Each band area includes a plurality of tracks. A track includes a plurality of sectors. Furthermore, an area obtained by dividing the disk 10 in the radial direction may be referred to as a radial area. Such a radial area includes a zone, a band area, a track, and the like.

The term "track" is used in this disclosure to indicate the following: one of a plurality of areas divided at points along the radial direction of the disk 10, a path of the head 15 at a predetermined radial position, data extending in the circumferential direction of the disk 10, one round of data written to a track at a certain radial position, data written to the track, a part of data written to the track, and various other meanings. The term "sector" is used in this disclosure to indicate one of a plurality of areas obtained by dividing a track at points along the circumferential direction, data written in a predetermined position on the disk 10, data written in a sector, and various other meanings.

The a "track written on the disk 10" may be referred to as a "write track", and a "track read from the disk 10" may be referred to as a "read track". A "write track" may be more simply referred to as a "track", a "read track" may be more simply referred to as a "track". A "write track" and a "read track" may both be referred to as a "track". A "width of a track in the radial direction" may be referred to as a "track width". A "width of the write track in the radial direction" may be referred to as a "write track width", and a "width of the read track in the radial direction" may be referred to as a "read track width". The "write track width" may be more simply referred to as a "track width", the "read track width" may be more simply referred to as a "track width". The "write track width" and "read track width" may be both referred to as a "track width".

A "path passing through the center position of a track width in a predetermined track" is referred to as a "track center". A "path passing through the center position of a write track width in a predetermined write track" may be referred to as a "write track center", and the "path passing through the center position of a read track width of a read track" may be referred to as a "read track center". The "write track center" may be more simply referred to as a "track center", the "read track center" may be more simply referred to as a "track center", and both the "write track center" and "read track center" may be referred to as a "track center".

The head 15 has a slider and includes a write head 15W and a read head 15R mounted on the slider. The write head 15W writes data to the disk 10. The read head 15R reads data from the disk 10. The "write head 15W" may be simply referred to as the "head 15", the "read head 15R" may be simply referred to as the "head 15", and the "write head 15W and read head 15R" may be collectively referred to as the "head 15". The "central part of the head 15" may be referred to as the "head 15", the "central part of the write head 15W" may be referred to as the "write head 15W", and the "central part of the read head 15R" may be referred to as the "read head 15R". The "central part of the write head 15W" may be simply referred to as the "head 15", and the "central part of the read head 15R" may be simply referred to as the "head 15". "Positioning the central part of the head 15 at the track center of a predetermined track" may be expressed as "positioning the head 15 on a particular track", "placing the head 15 on a particular track", or "positioning the head 15 on a particular track".

Figure 2:
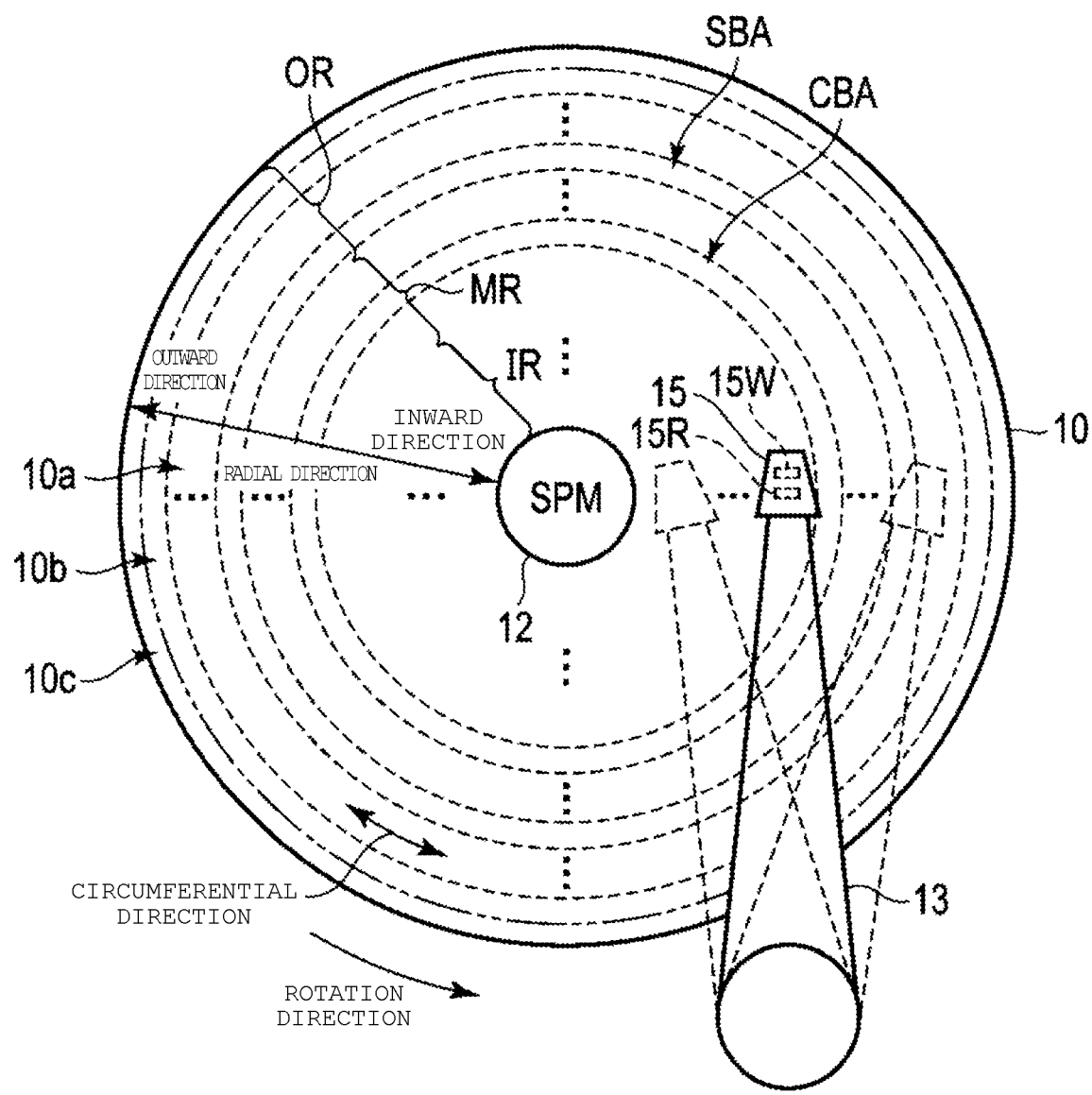
FIG. 2 is a schematic diagram illustrating a disk according to a first embodiment.

FIG. 2 is a schematic diagram illustrating the disk 10 according to the present embodiment. As illustrated in FIG. 2, the direction in which the disk 10 rotates in the circumferential direction is referred to as a rotation direction. In the example illustrated in FIG. 2, the rotation direction is counterclockwise, but may be reverse (e.g., clockwise). In FIG. 2, the disk 10 is divided into an inner circumferential area IR located inward, an outer circumferential area OR located outward, and a middle circumferential area MR located between the inner circumferential area IR and the outer circumferential area OR. For example, the inner circumferential area IR corresponds to a radial area from the innermost circumferential position of the disk 10 to a circumferential position separated from the innermost circumferential position by a predetermined distance outward. For example, the outer circumferential area OR corresponds to a radial area from the outermost circumferential position of the disk to a circumferential position separated from the outermost circumferential position by a predetermined distance inward.

FIG. 2 illustrates the media cache 10b. In FIG. 2, the media cache 10b and the system area 10c are located in the outer circumferential area OR. In the example illustrated in FIG. 2, the system area 10c is located at the outermost circumference of the disk 10. The media cache 10b is arranged adjacent to the inside of the system area 10c. Here, "adjacent" includes not only data, objects, areas, spaces, and the like being arranged side by side but also being arranged at certain intervals. The user data area 10a is arranged adjacent to the media cache 10b in the inward direction. The media cache 10b may be located in the inner circumferential area IR or the middle circumferential area MR. Further, the media cache 10b may be located dispersedly in the outer circumferential area OR, the middle circumferential area MR, and the inner circumferential area IR.

The user data area 10a of the disk 10 includes an area (hereinafter, may be referred to as a normal recording area) for writing data in a normal recording (CMR) format in which tracks adjacent to a particular track (hereinafter, may be referred to as adjacent tracks) are written at predetermined intervals in the radial direction from the particular track. Additionally, the user data area 10a includes an area (hereinafter, may be referred to as a shingled recording area) for writing data in a shingled recording (SMR or SWR) format in which a track to be written next overlaps a part of an adjacent track in the radial direction.

Hereinafter, "writing data in a normal recording type" may be simply referred to as "normal recording" or "normal recording processing", and "writing data in a shingled recording type" may be simply referred to as "shingled recording" or "shingled recording processing". Further, "write processing other than the normal recording processing" may be referred to as "shingled recording processing". In the user data area 10a, at least one shingled recording area may be arranged between a plurality of normal recording areas arranged at intervals in the radial direction, or at least one normal recording area may be arranged between a plurality of shingled recording areas arranged at intervals in the radial direction. The entire area of the user data area 10a may be a normal recording area, or the entire area of the user data area 10a may be a shingled recording area.

Each of the normal recording area and the shingled recording area includes at least one band area. Hereinafter, the "band area in a normal recording area" may be referred to as a "normal recording band area", and the "band area in a shingled recording area" may be referred to as a "shingled recording band area". Hereinafter, the "normal recording band area" is simply referred to as a "band area", the "shingled recording band area" is simply referred to as a "band area", and the "normal recording band area" and the "shingled recording band area" are collectively referred to as a "band area." Further, the "normal recording band area" may be referred to as a "normal recording area", and the "shingled recording band area" may be referred to as a "shingled recording area". In the example illustrated in FIG. 2, a normal recording band area CBA and a shingled recording band area SBA are arranged in the user data area 10a. In the user data area 10a, at least one shingled recording band area SBA may be arranged between a plurality of normal recording band areas CBA arranged at intervals in the radial direction, or at least one normal recording area CBA may be arranged between a plurality of shingled recording areas SBA arranged at intervals in the radial direction. The entire area of the user data area 10a may be the normal recording band area CBA or the shingled recording band area SBA.

The normal recording band area CBA includes a plurality of tracks written in normal recording. The normal recording band area CBA may include only one track. The shingled recording band area SBA includes a plurality of overlapping tracks in shingled recording. The shingled recording band area SBA may include at least one track written in normal recording. The shingled recording band area SBA may include only one track.

The driver IC 20 drives the SPM 12 and the VCM 14 under the control of the system controller 130 (or an MPU 60 described later in detail).

The head amplifier IC (or the preamplifier) 30 includes a read amplifier, a write driver, and the like. The read amplifier amplifies a read signal read from the disk 10 and outputs the amplified signal to the system controller 130 (specifically, a read/write (R/W) channel 50 described later). The write driver outputs a write current corresponding to the signal output from the R/W channel 50 to the head 15.

The volatile memory 70 is a semiconductor memory in which stored data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory that maintains data even when power supply is cut off. The nonvolatile memory 80 is, for example, a NOR or NAND flash read only memory (FROM).

The buffer memory 90 is a semiconductor memory for temporarily storing data and the like transmitted and received between the magnetic disk device 1 and the host 100. The buffer memory 90 may be configured integrally with the volatile memory 70. The buffer memory 90 is, for example, a DRAM, static random access memory (SRAM), SDRAM, ferroelectric random access memory (FeRAM), magnetoresistive random access memory (MRAM), or the like.

The system controller 130 is, for example, a large-scale integrated circuit (LSI) called a system-on-a-chip (SoC) in which a plurality of elements are integrated on a single chip. The system controller 130 includes a hard disk controller (HDC) 40, the read/write (R/W) channel 50, and a microprocessor or a micro-processing unit (MPU) 60. The HDC 40, the R/W channel 50, and the MPU 60 are electrically connected to each other. The system controller 130 is electrically connected to, for example, the driver IC 20, the head amplifier IC 30, the volatile memory 70, the nonvolatile memory 80, the buffer memory 90, the host system 100, and the like.

The HDC 40 controls data transfer between the host 100 and the R/W channel 50 according to an instruction from the MPU 60 described later. The HDC 40 is electrically connected to, for example, the volatile memory 70, the nonvolatile memory 80, the buffer memory 90, and the like.

The R/W channel 50 executes signal processing of read data and write data according to an instruction from the MPU 60. The R/W channel 50 has a circuit or function for modulating write data. The R/W channel 50 has a circuit or a function for measuring the signal quality of the read data. The R/W channel 50 is electrically connected to, for example, the head amplifier IC 30 or the like.

The MPU 60 is a main controller that controls each unit of the magnetic disk device 1. The MPU 60 controls the VCM 14 via the driver IC 20 to execute positioning of the head 15. The MPU 60 controls an operation of writing data to the disk 10 and selects a storage destination of the write data transferred from the host 100. The MPU 60 controls an operation of reading data from the disk 10 and controls the processing of read data transferred from the disk 10 to the host 100. The MPU 60 manages an area for recording data. The MPU 60 is connected to each unit of the magnetic disk device 1. The MPU 60 is electrically connected to, for example, the driver IC 20, the HDC 40, the R/W channel 50, and the like.

The MPU 60 operates as a read/write control unit 610 and a recording area management unit 620. For example, the MPU 60 executes firmware to perform functions of the read/write control unit 610 and the recording area management unit 620. Alternatively, one or more of those functions may be performed by one or more circuits.

The read/write control unit 610 controls data read processing and data write processing according to a command or the like from the host 100. The read/write control unit 610 controls the VCM 14 via the driver IC 20, sets the head at a particular radial position on the disk 10, and executes read processing or write processing. Hereinafter, "write processing" and "read processing" may be collectively expressed by the term "access" or "access processing".

The read/write control unit 610 selects and executes normal recording processing and shingled recording processing according to a command from the host 100 or the like. In other words, the read/write control unit 610 selectively executes normal recording processing or shingled recording processing according to a command from the host 100 or the like. The read/write control unit 610 writes data randomly or sequentially in the normal recording processing. The read/write control unit 610 sequentially writes data in the shingled recording processing. The read/write control unit 610 may execute only the normal recording processing, or may execute only the shingled recording processing. The read/write control unit 610 writes data at a different recording density, for example, bit per inch (BPI) according to the radial position. For example, the read/write control unit 610 writes data by adjusting the BPI for each zone.

The read/write control unit 610 executes normal recording processing in a normal recording area. In the normal recording band area CBA of the normal recording area, the read/write control unit 610 executes normal recording of data at a track pitch (hereinafter, may be referred to as a normal recording track pitch) at which a current track is written so as not to overlap an adjacent track. In other words, the read/write control unit 610 sets a normal recording track pitch in the normal recording band area CBA of the normal recording area as a track pitch at the time of the write processing and executes normal recording of data at the normal recording track pitch. The track pitch corresponds to, for example, a radial distance between track centers of two adjacent tracks in the radial direction. The read/write control unit 610 may execute the shingled recording processing in the normal recording band area CBA of the normal recording area. Further, the read/write control unit 610 may write data at a plurality of different track pitches in the normal recording band area CBA of the normal recording area.

The read/write control unit 610 executes write processing in the shingled recording area. The read/write control unit 610 writes data at a plurality of different track pitches in the shingled recording band area SBA of the shingled recording area. In other words, the read/write control unit 610 sets a plurality of different track pitches as a track pitch at the time of the write processing in the shingled recording band area SBA of the shingled recording area and writes data at the plurality of different track pitches. That is, the read/write control unit 610 can change the track pitch for each radial area in the write processing in the shingled recording band area SBA.

In the shingled recording band area SBA, the read/write control unit 610 writes data at different track pitches in a radial area (hereinafter may be referred to as a band boundary area) adjacent to the boundary (hereinafter, may be referred to as a band boundary) of the shingled recording band area SBA in the radial direction and an area (hereinafter, may be referred to as a non-band boundary area) other than the band boundary area.

In a band boundary area adjacent to an outer boundary of the shingled recording band area SBA, that is, an outermost band boundary area (hereinafter, may be referred to as an outermost band boundary area or a band boundary area), the read/write control unit 610 writes data at a predetermined track pitch (hereinafter, may be referred to as an outer boundary track pitch or a boundary track pitch). Hereinafter, the "outer boundary of the band area" or the "outer end of the band area" may be referred to as an "outer band end", an "outer band boundary", or a "band boundary".

In a band boundary area adjacent to an inner boundary of the shingled recording band area SBA, that is, an innermost band boundary area (hereinafter, may be referred to as an innermost band boundary area or a boundary area), the read/write control unit 610 writes data at a predetermined track pitch (hereinafter, may be referred to as an inner boundary track pitch or a boundary track pitch). Hereinafter, "the inner end of the band area" or "the inner boundary of the band area" may be referred to as an "inner band end", "inner band boundary", or "band boundary".

The read/write control unit 610 executes shingled recording of data at a track pitch (hereinafter, may be referred to as a shingled recording track pitch) at which a current track overlaps an adjacent track in a non-band boundary area of the shingled recording band area SBA. The boundary track pitch (outer boundary track pitch and inner boundary track pitch) is, for example, larger than the shingled recording track pitch. The boundary track pitch (that is, the outer boundary track pitch and the inner boundary track pitch) is, for example, the same as the normal recording track pitch. Terms such as "same", "identical", "match", and "equivalent" include not only the meaning of exactly the same, but also the meaning of being different enough to be considered substantially the same. The read/write control unit 610 may execute shingled recording of data at only one track pitch, for example, only the shingled recording track pitch, in the shingled recording band area SBA.

For example, in the outermost band boundary area (referred to as the band boundary area) of the shingled recording band area SBA of the shingled recording area, the read/write control unit 610 writes a track closest to the outer band boundary (hereinafter, this track may be referred to as an outermost band track, a boundary band track, an outermost band boundary area, or a band boundary area), that is, the outermost track. In the outermost band boundary area of the shingled recording band area SBA, the read/write control unit 610 writes a predetermined track (hereinafter, may be referred to as a first outer boundary area band track, a first boundary area band track, an outermost band boundary area, or a band boundary area.) at the outer boundary track pitch (which may also be referred to as a boundary track pitch) in a forward direction (the inward direction in this context) from the outermost band track. In this disclosure, a direction in which data is sequentially written and read in the radial direction is referred to as the forward direction.

In the outermost band boundary area of the shingled recording band area SBA, the read/write control unit 610 first writes at least one track (here also referred to as an outer boundary area band track, a boundary area band track, an outermost band boundary area or a band boundary area) from the first outer boundary area band track to a predetermined track (here also referred to as a last outer boundary area band track, a last boundary area band track, an outermost band boundary area, or a band boundary area) in the forward direction at the outer boundary track pitch.

In the non-band boundary area of the shingled recording band area SBA, the read/write control unit 610 writes a predetermined track (hereinafter, referred to as a start track, or a non-band boundary area) at the outer boundary track pitch in the forward direction from the last outer boundary area band track. In the non-band boundary area of the shingled recording band area SBA, the read/write control unit 610 executes shingled recording of a plurality of tracks in the forward direction from a start track to a predetermined track (hereinafter, may be referred to as a last track or a non-band boundary area) at the shingled recording track pitch.

In the innermost band boundary area of the shingled recording band area SBA, the read/write control unit 610 writes a predetermined track (hereinafter, may also be referred to as a first inner boundary area band track, a first boundary area band track, an innermost band boundary area, or a boundary area) at the inner boundary track pitch (boundary track pitch) in the forward direction from the last track. In the innermost band boundary area of the shingled recording band area SBA, the read/write control unit 610 writes at least one track (here referred to as an inner boundary area band track, a boundary area band track, an innermost band boundary area, or a band boundary area)

from the first inner boundary area band track to a predetermined track (hereinafter, may be referred to as a last inner boundary area band track or a last boundary area band track) in the forward direction at the inner boundary track pitch. In the innermost band boundary area of the shingled recording band area SBA, the read/write control unit 610 writes a track (hereinafter, may be referred to as an innermost band track, a boundary band track, an innermost band boundary area, or a band boundary area) closest to the inner band boundary, that is, the innermost track, at the inner boundary track pitch in the forward direction from the last inner boundary area band track.

For example, the read/write control unit 610 writes the outermost band track (also referred to as the boundary band track, outermost band boundary area, or band boundary area) in the outermost band boundary area of the shingled recording band area SBA of the shingled recording area. The read/write control unit 610 writes a start track at the outer boundary track pitch in the forward direction from the outermost band track in the outermost band boundary area of the shingled recording band area SBA. The read/write control unit 610 executes shingled recording of a plurality of tracks in the non-band boundary area from the start track to the last track in the non-band boundary area of the shingled recording band area SBA at the shingled recording track pitch in the forward direction. The read/write control unit 610 writes the innermost band track (here also referred to as the boundary band track, innermost band boundary area, or band boundary area) in the innermost band boundary area of the shingled recording band area SBA at the inner boundary track pitch in the forward direction from the last track.

For example, the read/write control unit 610 writes the innermost band track in the innermost band boundary area of the shingled recording band area SBA of the shingled recording area. The read/write control unit 610 writes a first inner boundary area band track in the innermost band boundary area of the shingled recording band area SBA at the inner boundary track pitch in the forward direction (in this context, the outward direction) from the innermost band track. In the innermost band boundary area of the shingled recording band area SBA, the read/write control unit 610 writes at least one inner boundary area band track from the first inner boundary area band track to the last inner boundary area band track at the inner boundary track pitch in the forward direction.

In the non-band boundary area of the shingled recording band area SBA, the read/write control unit 610 writes the start track at the inner boundary track pitch in the forward direction from the last inner boundary area band track. In the non-band boundary area of the shingled recording band area SBA, the read/write control unit 610 executes shingled recording of a plurality of tracks in the forward direction from the start track to the last track at the shingled recording track pitch.

In the outermost band boundary area of the shingled recording band area SBA, the read/write control unit 610 writes a first outer boundary area band track at the outer boundary track pitch in the forward direction from the last track. In the outermost band boundary area of the shingled recording band area SBA, the read/write control unit 610 writes at least one outer boundary area band track from the first outer boundary area band track to the last outer boundary area band track at the outer boundary track pitch in the forward direction. In the outermost band boundary area of the shingled recording band area SBA, the read/write control unit 610 writes the track closest to the outer boundary, that is, the outermost band track positioned at the outer boundary track pitch from the last outer boundary area band track.

For example, the read/write control unit 610 writes the innermost band track in the innermost band boundary area of the shingled recording band area SBA of the shingled recording area. In the non-band boundary area of the shingled recording band area SBA, the read/write control unit 610 writes the start track at the inner boundary track pitch in the forward direction from the innermost band track. In the non-band boundary area of the shingled recording band area SBA, the read/write control unit 610 executes shingled recording of a plurality of tracks in the forward direction from the start track to the last track at the shingled recording track pitch in the forward direction In the outermost band boundary area of the shingled recording band area SBA, the read/write control unit 610 writes the outermost band track at the outer boundary track pitch in the forward direction from the last track.

Figure 3:
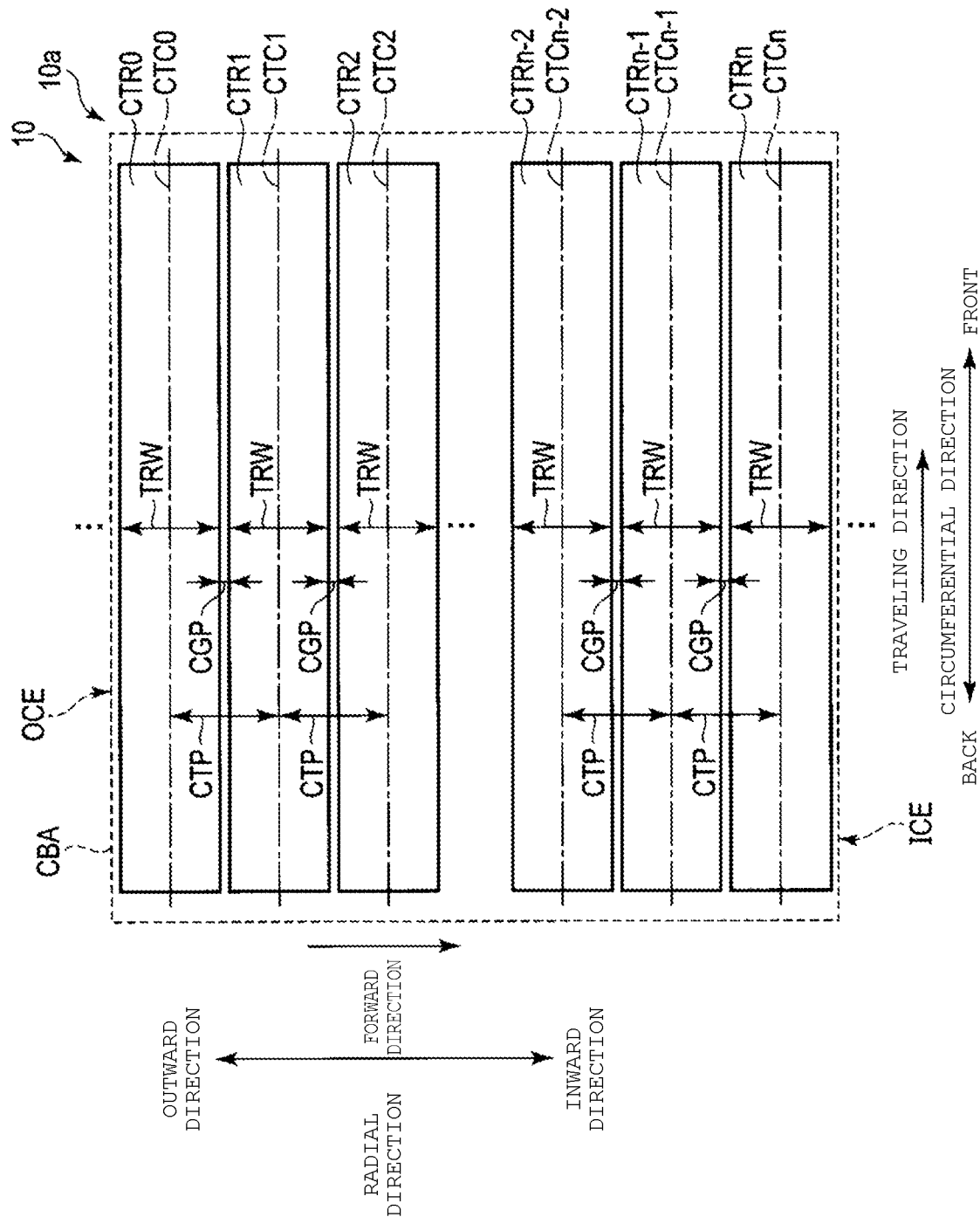
FIG. 3 is a schematic diagram illustrating a normal recording processing.

FIG. 3 is a schematic diagram illustrating the normal recording processing. FIG. 3 illustrates the normal recording band area CBA. FIG. 3 illustrates an outer band boundary OCE of the normal recording band area CBA and an inner band boundary ICE of the normal recording band area CBA. In FIG. 3, the forward direction is the inward direction. However, the forward direction may be the outward direction. As illustrated in FIG. 3, a direction in which the head 15 advances with respect to the disk 10 in the circumferential direction, that is, a direction in which reading/writing is executed, may be referred to as a traveling direction.

In the example illustrated in FIG. 3, the normal recording band area CBA includes a track CTR0, a track CTRL, a track CTR2, . . . , a track CTRn–2, a track CTRn–1, and a track CTRn. In FIG. 3, the tracks CTR0 to CTRn are arranged in the stated order along the inward direction. In FIG. 3, the track CTR0 closest to the outer band boundary OCE of the normal recording band area CBA, that is, the outermost track CTR0 in the normal recording band area CBA, corresponds to the outermost band track CTR0, and the track CTRn closest to the inner band boundary ICE of the normal recording band area CBA, that is, the innermost track CTRn in the normal recording band area CBA, corresponds to the innermost band track CTRn.

FIG. 3 illustrates a track center CTC0 of the track CTR0 having a track width TRW, a track center CTC1 of the track CTR1 having the track width TRW, a track center CTC2 of the track CTR2 having the track width TRW, . . . , a track center CTCn–2 of the track CTRn–2 having the track width TRW, a track center CTCn–1 of the track CTRn–1 having the track width TRW, and a track center CTCn of the track CTRn having the track width TRW. The tracks CTR0 to CTRn may have different track widths.

In the example illustrated in FIG. 3, the tracks CTR0 to CTRn are each arranged at a normal recording track pitch CTP in the radial direction. For example, the track center CTC0 of the track CTR0 and the track center CTC1 of the track CTR1 are separated from each other at the normal recording track pitch CTP in the radial direction, and the track center CTC1 of the track CTR1 and the track center CTC2 of the track CTR2 are separated at the normal recording track pitch CTP in the radial direction. Further, for example, the track center CTCn–2 of the track CTRn–2 and the track center CTCn–1 of the track CTRn–1 are separated at the normal recording track pitch CTP in the radial direction, and the track center CTCn–1 of the track CTRn–1 and the track center CTCn of the track CTRn are separated at the normal recording track pitch CTP in the radial direction. The tracks CTR0 to CTRn may be arranged at different track pitches in the radial direction.

In the example illustrated in FIG. 3, the tracks CTR0 to CTRn are arranged with a gap CGP in the radial direction. For example, the track CTR0 and the track CTR1 are separated with the gap CGP in the radial direction, and the track CTR1 and the track CTR2 are separated with the gap CGP in the radial direction. The track CTRn−2 and the track CTRn−1 are separated by the gap CGP in the radial direction, and the track CTRn−1 and the track CTRn are separated with the gap CGP in the radial direction. The tracks CTR0 to CTRn may be arranged with different gaps.

In FIG. 3, for convenience of description, each track is illustrated as a rectangular shape extending in the circumferential direction with a predetermined track width, but is actually curved along the circumferential direction. Further, each track may have a wavy shape that varies in the radial direction and extends in the circumferential direction.

In the example illustrated in FIG. 3, the read/write control unit 610 positions the head 15 at the track center CTC0 in the normal recording band area CBA of the user data area 10a and executes normal recording of the track CTR0. In the normal recording band area CBA, the read/write control unit 610 positions the head 15 at the track center CTC1 which is separated from the track center CTC0 of the track CTR0 inward at the normal recording track pitch CTP and executes normal recording of the track CTR1. In the normal recording band area CBA, the read/write control unit 610 positions the head 15 at the track center CTC2 which is separated from the track center CTC1 of the track CTR1 inward at the normal recording track pitch CTP and executes normal recording of the track CTR2.

In the example illustrated in FIG. 3, in the normal recording band area CBA, the read/write control unit 610 positions the head 15 at the track center CTCn−1 which is separated from the track center CTCn−2 of the track CTRn−2 inward at the normal recording track pitch CTP and executes normal recording of the track CTRn−1. In the normal recording band area CBA, the read/write control unit 610 positions the head 15 at the track center CTCn which is separated at the normal recording track pitch CTP inward from the track center CTCn−1 of the track CTRn−1 and executes normal recording of the track CTRn.

In the example illustrated in FIG. 3, in the normal recording band area CBA, the read/write control unit 610 may sequentially execute normal recording on sectors of the tracks CTR0, CTR1, CTR2, . . . , CTRn−2, CTRn−1, and CTRn, or may randomly execute normal recording on sectors of the tracks CTR0, CTR1, CTR2, . . . , CTRn−2, CTRn−1, and CTRn.

Figure 4:
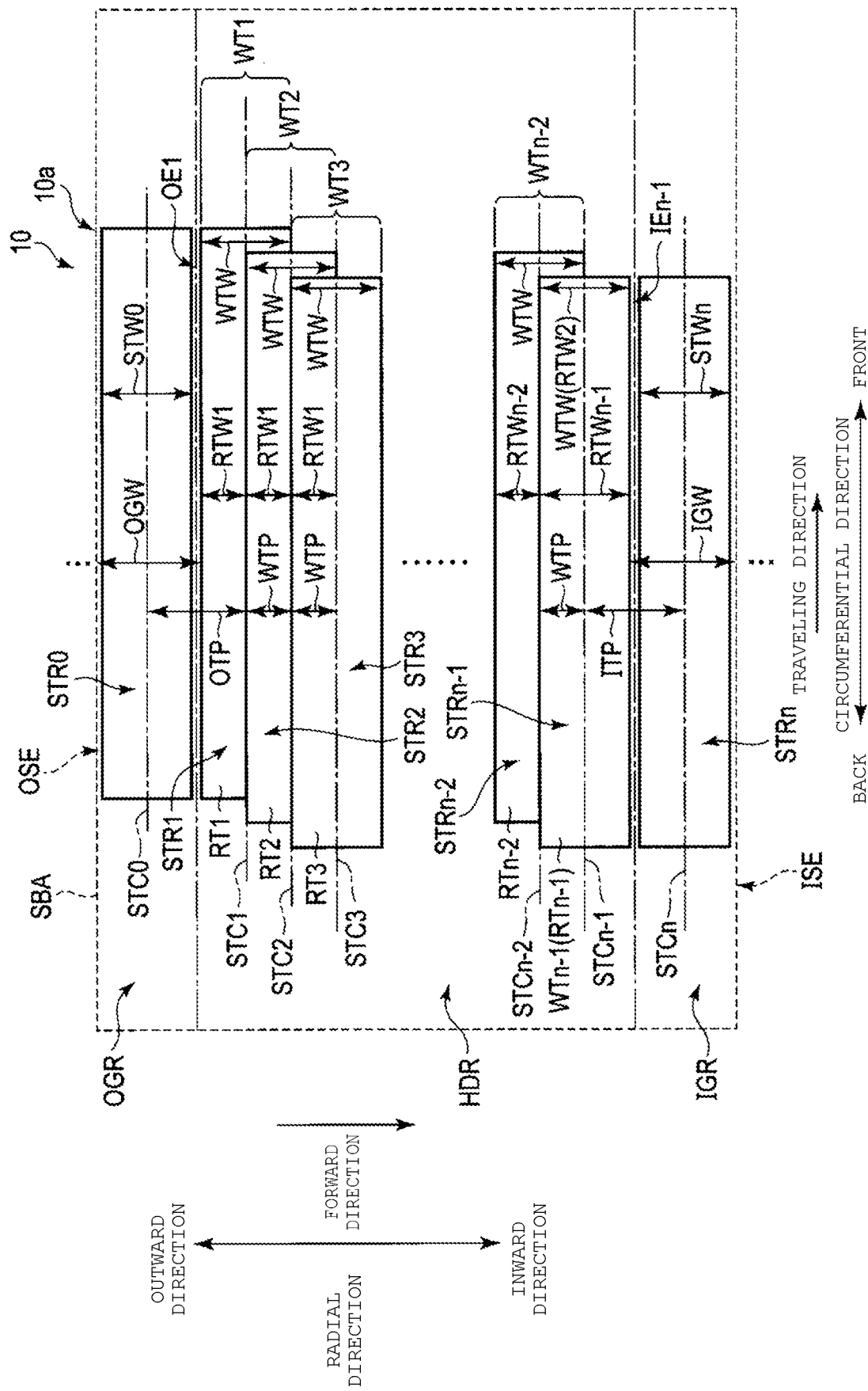
FIG. 4 is a schematic diagram illustrating shingled recording processing in a shingled recording band area according to a first embodiment.

FIG. 4 is a schematic diagram illustrating shingled recording processing in a shingled recording band area according to the present embodiment. FIG. 4 illustrates the shingled recording band area SBA. FIG. 4 illustrates an outer band boundary OSE of the shingled recording band area SBA and an inner band boundary ISE of the shingled recording band area SBA. In the example illustrated in FIG. 4, the shingled recording band area SBA includes tracks STR0, STR1, STR2, . . . , STRn−2, STRn−1, and STRn. In FIG. 4, the tracks STR0 to STRn are arranged in the stated order in the inward direction. In FIG. 4, the tracks STR1 to STRn−1 overlap adjacent tracks in the forward direction. In FIG. 4, the track STR0 closest to the outer band boundary OSE of the shingled recording band area SBA, that is, the outermost track STR0 in the shingled recording band area SBA corresponds to the outermost band track STR0, and the track STRn closest to the inner band boundary ISE of the shingled recording band area SBA, that is, the innermost track STRn in the shingled recording band area SBA corresponds to the innermost band track STRn. In FIG. 4, the track STR1 of the plurality of overlapping tracks STR1 to STRn−1 corresponds to the start track STR1, and the track STRn−1 of the plurality of overlapping tracks STR1 to STRn−1 corresponds to the last track STRn−1.

FIG. 4 illustrates a radial area OGR (hereinafter, may be referred to as an outer guard area or a guard area) from the outer band boundary OSE to the outer end OE1 of the start track STR1, and a radial area IGR (hereinafter, may be referred to as an inner guard area or a guard area) from the inner band boundary ISE to the inner end IEn−1 of the last track STRn−1. In FIG. 4, the outer guard area OGR corresponds to an outermost band boundary area, and the inner guard area IGR corresponds to an innermost band boundary area. Each guard area (that is, the outer guard area OGR and the inner guard area IGR) corresponds to an area in which at least one guard cylinder or guard track for reducing the influence of leakage magnetic flux (e.g., Adjacent Track Interference: ATI) or the like generated from the head 15 is arranged, for example, when writing a track in a shingled recording band area adjacent to a particular shingled recording band area in the radial direction. FIG. 4 illustrates a width OGW (hereinafter, may be referred to as an outer guard area width or a guard area width) of the outer guard area OGR in the radial direction and a width IGW of the inner guard area IGR (hereinafter, may be referred to as an inner guard area width or a guard area width) in the radial direction. For example, the outer guard area width OGW is identical with the inner guard area width IGW. The outer guard area width OGW and the inner guard area width IGW may be different. FIG. 4 illustrates a high recording density area HDR other than each guard area (that is, outer guard area OGR and the inner guard area IGR) of the shingled recording band area SBA. In FIG. 4, the high recording density area HDR corresponds to a non-band boundary area.

In FIG. 4, the outermost band track STR0 having a track width STW0 is arranged in the outer guard area OGR. For example, the track center STC0 of the outermost band track STR0 overlaps the center position of the outer guard area width OGW of the outer guard area OGR. The track center STC0 of the outermost band track STR0 may be shifted from the center position of the outer guard area width OGW of the outer guard area OGR. The outer guard area width OGW of the outer guard area OGR is larger than the track width STW0. In FIG. 4, the outer guard area width OGW corresponds to a width in the radial direction in which one outermost band track STR0 having the track width STW0 can be arranged.

In FIG. 4, the innermost band track STRn having a track width STWn is arranged in the inner guard area IGR. For example, the track center STRn of the innermost band track STRn overlaps the center position of the inner guard area width IGW of the inner guard area IGR. The track center STCn of the innermost band track STRn may be shifted from the center position of the inner guard area width IGW of the inner guard area IGR. The inner guard area width IGW of the inner guard area IGR is larger than track width STWn. In FIG. 4, the inner guard area width IGW corresponds to a width in the radial direction in which one innermost band track STRn having the track width STWn can be arranged.

For example, the track width STW0 may be identical with the track width STWn. Further, for example, the track width STW0 and the track width STWn are identical with the track width TRW of the normally recorded track illustrated in FIG. 3.

The outer guard area width OGW may be a width in which a plurality of tracks can be arranged, and the inner guard area width IGW may be a width in which a plurality of tracks can be arranged. In the outer guard area OGR and the inner guard area IGR, the same number of tracks having the same width in the radial direction may be arranged, or different numbers of tracks having the same width in the radial direction may be arranged. In the outer guard area OGR and the inner guard area IGR, the same number of tracks having different widths in the radial direction may be arranged, or different numbers of tracks having different widths in the radial direction may be arranged. The track width STW0 and the track width STWn may be different. Further, the track width STW0 and the track width STWn may be different from the track width TRW.

In FIG. 4, in a plurality of overlapping tracks STR1 to STRn−1, the track STR1 written on the disk 10 by the write head 15W is referred to as a write track WT1, the track STR2 written on the disk 10 by the write head 15W is referred to as a write track WT2, the track STR3 written on the disk 10 by the write head 15W is referred to as a write track WT3, the track STRn−2 written to the disk 10 by the write head 15W is referred to as a write track WTn−2, and the track STRn−1 written to the disk 10 by the write head 15W is referred to as a write track WTn−1.

FIG. 4 illustrates a track center STC1 of the write track WT1 (track STR1) having a write track width WTW, a track center STC2 of the write track WT2 (track STR2) having the write track width WTW, and a track center STC3 of the write track WT3 (track STR3) having the write track width WTW, . . . , a track center STCn−2 of the write track WTn−2 (track STRn−2) having the write track width WTW, and a track center STCn−1 of the write track WTn−1 (track STRn−1) having the write track width WTW. The write tracks WT1 to WTn−1 may have different write track widths. The write track width WTW is, for example, the same as the track width STW0 of the outermost band track STR0 and the track width STWn of the innermost band track STRn. Further, the write track width WTW may be different from the track width STW0 of the outermost band track STR0 and the track width STWn of the innermost band track STRn.

In the example illustrated in FIG. 4, the write track WT1 is separated from the outermost band track STR0 inward at an outer boundary track pitch OTP. For example, the track center STC0 of the outermost band track STR0 and the track center STC1 of the write track WT1 are separated at the outer boundary track pitch OTP in the radial direction. Further, the write track WTn−1 is separated from the innermost band track STRn outward at an inner boundary track pitch ITP. Further, for example, the track center STCn of the innermost band track STRn and the track center STCn−1 of the write track WTn−1 are separated at the inner boundary track pitch ITP in the radial direction. The outer boundary track pitch OTP and the inner boundary track pitch ITP are, for example, the same. The outer boundary track pitch OTP and the inner boundary track pitch ITP are, for example, the same as the normal recording track pitch CTP. The outer boundary track pitch OTP and the inner boundary track pitch ITP may be different. Further, the outer boundary track pitch OTP and the inner boundary track pitch ITP may be different from the normal recording track pitch CTP.

In the example illustrated in FIG. 4, the write tracks WT1 (track STR1) to WTn−1 (STRn−1) are each arranged at the shingled recording track pitch WTP in the radial direction. The shingled recording track pitch WTP is smaller than the normal recording track pitch CTP, for example. For example, the track center STC1 of the write track WT1 and the track center STC2 of the write track WT2 are separated at the shingled recording track pitch WTP in the radial direction. For example, the track center STC2 of the write track WT2 and the track center STC3 of the write track WT3 are separated at the shingled recording track pitch WTP in the radial direction. Further, for example, the track center STCn−2 of the write track WTn−2 and the track STCn−1 of the write track WTn−1 are separated at the shingled recording track pitch WTP in the radial direction. The write tracks WT1 (track STR1) to WTn−1 (track STRn−1) may be arranged at different track pitches in the radial direction.

Further, the write tracks WT1 (track STR1) to WTn−1 (track STRn−1) each overlap adjacent write tracks in the forward direction. The area of the remaining write track WT1 other than the area where the write track WT2 overlaps is referred to as a read track RT1 (track STR1), and the area of the remaining write track WT2 other than the area where the write track WT3 overlaps is referred to as a read track RT2 (track STR2), the area of the remaining write track WTn−2 other than the area where the write track WTn−1 overlaps is referred to as a read track RTn−2 (track STRn−2). When the data is sequentially written in the forward direction in the shingled recording band area SBA, the write track WTn−1 (last track STRn−1) which is written last and does not overlap with other write tracks may be referred to as a read track WTn−1 (last track STRn−1). FIG. 4 illustrates a read track width RTW1 of the read tracks RT1 to RTn−2. In FIG. 4, the read track width RTW2 of the read track RTn−1 is the same as the write track width WTW of the write track WTn−1. The read track width RTW1 is smaller than the write track width WTW. The read tracks RT1 to RTn−2 may have different read track widths.

In FIG. 4, for convenience of description, each track is illustrated as a rectangular shape extending in the circumferential direction with a predetermined track width, but is actually curved along the circumferential direction. Further, each track may have a wavy shape that varies in the radial direction and extends in the circumferential direction.

In the example illustrated in FIG. 4, the read/write control unit 610 positions the head 15 at the track center STC0 in the outer guard area OGR of the shingled recording band area SBA of the user data area 10*a*, and writes (for example, normal recording) the outermost band track STR0.

In the example illustrated in FIG. 4, in the high recording density area HDR of the shingled recording band area SBA of the user data area 10*a*, the read/write control unit 610 sequentially executes shingled recording of the write track WT1, the write track WT2, the write track WT3, . . . , the write track WTWn−2, and the write track WTWn−1 in the stated order in the forward direction. In other words, the read/write control unit 610 writes the track STR1 (write track WT1), the track STR2 (write track WT2), the track STR3 (write track WT3), . . . , the track STRn−2 (write track WTn−2), and the track STRn−1 (write track WTn−1) in the shingled recording band area SBA of the user data area 10*a* such that each track overlaps adjacent tracks in the forward direction in the stated order.

In the example illustrated in FIG. 4, in the high recording density area HDR of the shingled recording band area SBA of the user data area 10*a*, the read/write control unit 610 positions the head 15 at the track center STC1 that is separated from the track center STC0 of the outermost band track STR0 at the track pitch OTP in the forward direction, and writes the write track WT1 (start track STR1). In other words, the read/write control unit 610 writes the start track STR1 at a distance in the radial direction so as not to overlap the outermost band track STR0 in the high recording density area HDR. The read/write control unit 610 positions the head 15 at the track center STC2 which is separated from the track center STC1 of the write track WT1 (start track STR1) at the track pitch WTP in the forward direction in the high recording density area HDR, and executes shingled recording of the write track WT2 on the write track WT1. The read/write control unit 610 positions the head 15 at the track center STC3 which is separated from the track center STC2 of the write track WT2 at the track pitch WTP in the forward direction in the high recording density area HDR and executes shingled recording of the write track WT3 on the write track WT2. The read/write control unit 610 positions the head 15 at the track center STCn−1 which is separated from the track center STCn−2 of the write track WTn−2 at the track pitch WTP in the forward direction in the high recording density area HDR, and executes shingled recording of the write track WTn−1 (last track STRn−1) on the write track WTn−2.

In the example illustrated in FIG. 4, in the inner guard area IGR of the shingled recording band area SBA of the user data area 10a, the read/write control unit 610 positions the head 15 at the track center STCn which is separated from the track center STCn−1 of the last track STRn−1 (write track WTn−1) at the track pitch ITP in the forward direction, and writes the innermost band track STRn. In other words, the read/write control unit 610 writes the innermost band track STRn in the inner guard area IGR at a distance in the radial direction so as not to overlap the last track STRn−1 (for example, normal recording).

The recording area management unit 620 manages recording areas of the disk 10 (hereinafter, also simply referred to as the disk 10) according to an instruction from the host 100 or the like. The recording area management unit 620 sets a normal recording area and a shingled recording area in the user data area 10a of the disk 10 according to an instruction from the host 100 or the like. The recording area management unit 620 sets a normal recording area for each normal recording band area CBA in the user data area 10a, for example. In other words, the recording area management unit 620 sets, for example, the normal recording band area CBA in the user data area 10a.

Additionally, the recording area management unit 620 sets a shingled recording area for each shingled recording band area SBA in the user data area 10a, for example. In other words, the recording area management unit 620 sets, for example, the shingled recording band area SBA in the user data area 10a.

The recording area management unit 620 can change the normal recording band area CBA to the shingled recording band area SBA according to an instruction from the host 100 or the like. Further, the recording area management unit 620 can change the shingled recording band area SBA to the normal recording band area CBA according to an instruction from the host 100 or the like. Hereinafter, "changing the normal recording band area CBA to the shingled recording band area SBA" and "changing the shingled recording band area SBA to the normal recording band area CBA" may be referred to as "media conversion".

The recording area management unit 620 may record information on the set normal recording band area CBA and information on the set shingled recording band area SBA in a table stored in a predetermined recording area, for example, the system area 10c of the disk 10, the nonvolatile memory 80, or the like. The recording area management unit 620 may set the entire area of the user data area 10a of the disk 10 as the normal recording band area CBA, or may set the entire area of the user data area 10a of the disk 10 as the shingled recording band area SBA.

For example, when the recording area management unit 620 arranges a plurality of normal recording band areas CBA that are continuous in the radial direction, the read/write control unit 610 executes predetermined processing, for example, writes a boundary band track in the target normal recording band area CBA at a predetermined track pitch (hereinafter, may be referred to as a track pitch between bands) in the radial direction from the boundary band track of the normal recording band area CBA which is radially adjacent to the normal recording band area CBA to be accessed or the like (hereinafter, may be referred to as a target normal recording band area). The read/write control unit 610 executes normal recording of a plurality of tracks at the normal recording track pitch CTP in the target normal recording band area CBA, as illustrated in FIG. 3. Hereinafter, the "track pitch between bands of the boundary band track between two normal recording band areas CBA adjacent in the radial direction" may be referred to as a "track pitch between normal recording bands".

For example, when the recording area management unit 620 arranges a plurality of shingled recording band areas SBA that are continuous in the radial direction, the read/write control unit 610 executes predetermined processing, for example, writes a boundary band track in the guard area of the target shingled recording band area SBA at the track pitch between bands in the radial direction from the boundary band track of the normal recording band area SBA which is adjacent to the shingled recording band area SBA to be accessed or the like (hereinafter, may be referred to as a target shingled recording band area) in the radial direction. As illustrated in FIG. 4, the read/write control unit 610 executes shingled recording of a plurality of tracks in the high recording density area HDR of the target shingled recording band area SBA at the shingled recording track pitch WTP in the forward direction. Hereinafter, the "track pitch between bands of the boundary band track between two shingled recording band areas SBA adjacent in the radial direction" may be referred to as a "track pitch between shingled recording bands".

For example, when the recording area management unit 620 changes one of the plurality of shingled recording band areas SBA that are continuous in the radial direction to the normal recording band area CBA (media conversion), the read/write control unit 610 writes a boundary band track in the normal recording band area CBA at the track pitch between bands from the boundary band track of the shingled recording band area SBA adjacent to the normal recording band area CBA in the radial direction. The read/write control unit 610 executes normal recording of a plurality of tracks at the normal recording track pitch CTP in the normal recording band area CBA, as illustrated in FIG. 3. In other words, when the recording area management unit 620 arranges the normal recording band area CBA so as to be adjacent to the shingled recording band area SBA in the radial direction, the read/write control unit 610 writes a boundary band track in the normal recording band area CBA at the track pitch between bands from the boundary band track of the shingled recording band area SBA adjacent to the normal recording band area CBA in the radial direction. The read/write control unit 610 executes normal recording of a plurality of tracks at the normal recording track pitch CTP in the normal recording band area CBA, as illustrated in FIG. 3. Hereinafter, the "track pitch between bands of the boundary band track of the shingled recording band area SBA and the boundary band track of the normal recording band area CBA that are adjacent in the radial direction" may be referred to as a "track pitch between shingled/normal recording bands".

For example, when the recording area management unit 620 changes one of a plurality of normal recording areas CBA that are continuous in the radial direction to the shingled recording band area SBA (media conversion), the read/write control unit 610 writes a boundary band track in the guard area of the shingled recording band area SBA at the track pitch between shingled/normal recording bands in the radial direction from the boundary band track of the normal recording area CBA adjacent in the radial direction. As illustrated in FIG. 4, the read/write control unit 610 executes shingled recording of a plurality of tracks in the high recording density area HDR of the shingled recording band area SBA at the shingled recording track pitch WTP in the forward direction. In other words, when the recording area management unit 620 arranges the shingled recording band area SBA so as to be adjacent to the normal recording band area CBA in the radial direction, the read/write control unit 610 writes a boundary band track in the guard area of the shingled recording band area SBA at the track pitch between shingled/normal recording bands from the boundary band track of the normal recording band area CBA adjacent to the shingled recording band area SBA in the radial direction. As illustrated in FIG. 4, the read/write control unit 610 executes shingled recording of a plurality of tracks in the high recording density area HDR of the shingled recording band area SBA at the shingled recording track pitch WTP in the forward direction.

The track pitch between bands is, for example, the same as the normal recording track pitch. The track pitch between bands may be different from the normal recording track pitch. The track pitch between normal recording bands, the track pitch between shingled recording bands, and the track pitch between shingled/normal recording bands are the same, for example. The track pitch between normal recording bands, the track pitch between shingled recording bands, and the track pitch between shingled/normal recording bands may be different.

Figure 5:
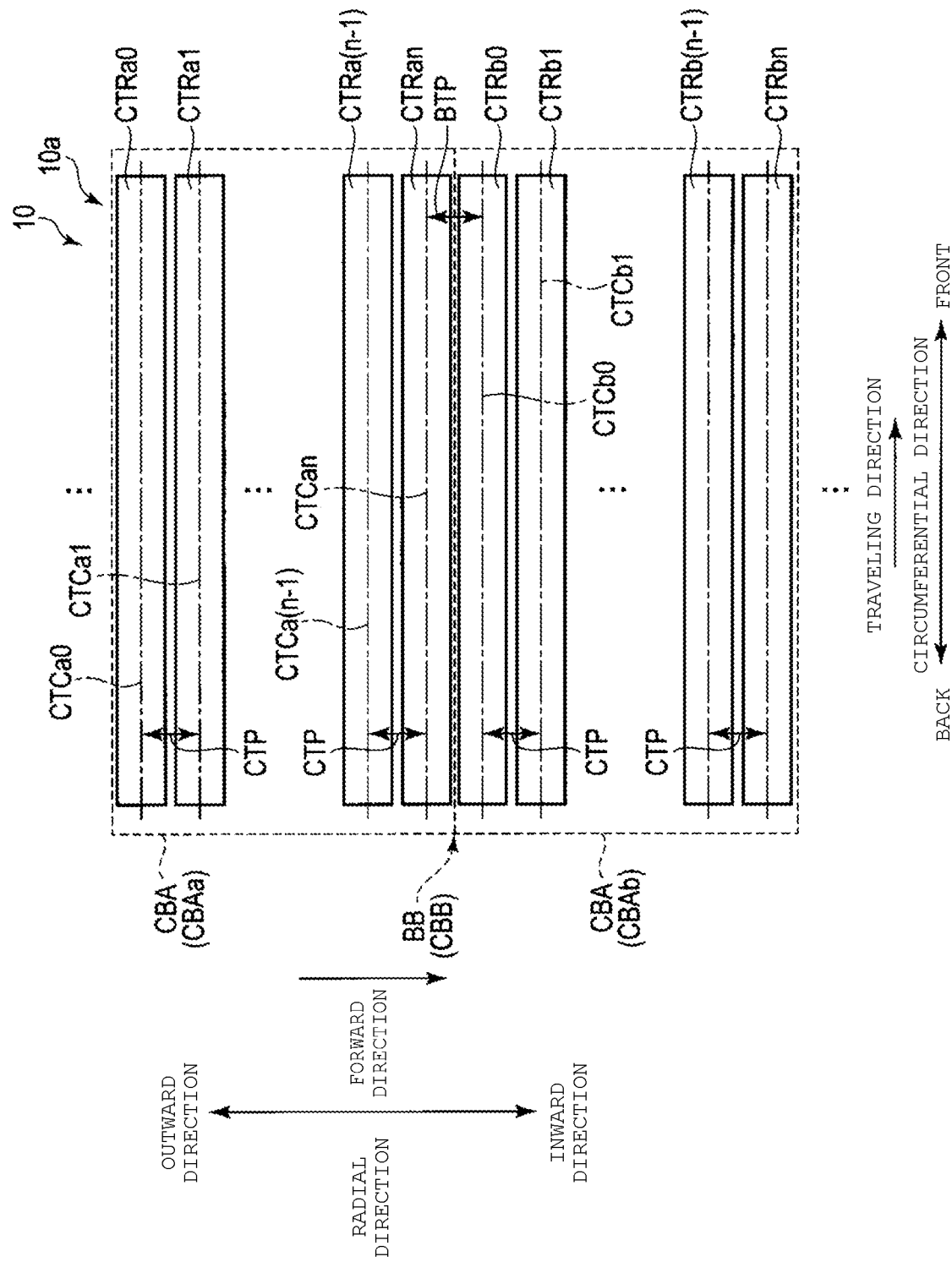
FIG. 5 is a schematic diagram illustrating an arrangement of a plurality of normal recording band areas arranged in a radial direction.

FIG. 5 is a schematic diagram illustrating an arrangement of a plurality of normal recording band areas CBA arranged in the radial direction. In FIG. 5, the normal recording band area CBA includes two normal recording band areas CBAa and two normal recording band areas CBAb that are adjacent in the radial direction. FIG. 5 illustrates a boundary BB between the normal recording band area CBAa and the normal recording band area CBAb (hereinafter, also referred to as a boundary between normal recording bands CBB). Hereinafter, the "boundary between two adjacent band areas" may be referred to as an "inter-band boundary". The configuration of the normal recording band areas CBAa and CBAb is the same as that of the normal recording band area CBA illustrated in FIG. 3.

In the example illustrated in FIG. 5, the normal recording band area CBAa includes a track CTRa0, a track CTRa1, . . . , a track CTRa(n-1), and a track CTRan. In FIG. 5, the tracks CTRa0 to CTRan are arranged in the stated order in the inward direction. In FIG. 5, the track CTRa0 corresponds to the outermost band track CTRa0, and the track CTRan corresponds to the innermost band track CTRan.

FIG. 5 illustrates a track center CTCa0 of the track CTRa0, a track center CTCa1 of the track CTRa1, . . . , a track center CTCa(n-1) of the track CTRa(n-1), and a track center CTCan of the track CTRan. In the example illustrated in FIG. 5, the tracks CTRa0 to CTRan are each arranged at the normal recording track pitch CTP in the radial direction. For example, the track center CTCa0 of the track CTRa0 and the track center CTCa1 of the track CTRa1 are separated at the normal recording track pitch CTP in the radial direction. For example, the track center CTCa(n-1) of the track CTRa(n-1) and the track center CTCan of the track CTRan are separated from at the normal recording track pitch CTP in the radial direction. The tracks CTRa0 to CTRan may be arranged at different track pitches in the radial direction.

In the example illustrated in FIG. 5, the normal recording band area CBAb includes a track CTRb0, a track CTRb1, . . . , a track CTRb(n-1), and a track CTRbn. In FIG. 5, the tracks CTRb0 to CTRbn are arranged in the stated order in the inward direction. In FIG. 5, the track CTRb0 corresponds to the outermost band track CTRb0, and the track CTRbn corresponds to the innermost band track CTRbn.

FIG. 5 illustrates a track center CTCb0 of the track CTRb0, a track center CTCb1 of the track CTRb1, . . . , a track center CTCb(n-1) of the track CTRb(n-1), and a track center CTCbn of the track CTRbn. In the example illustrated in FIG. 5, the tracks CTRb0 to CTRbn are each arranged at the normal recording track pitch CTP in the radial direction. For example, the track center CTCb0 of the track CTRb0 and the track center CTCb1 of the track CTRb1 are separated at the normal recording track pitch CTP in the radial direction. For example, the track center CTCb(n-1) of the track CTRb(n-1) and the track center CTCbn of the track CTRbn are separated at the normal recording track pitch CTP in the radial direction. In FIG. 5, the track center CTCb0 of the outermost band track CTRb0 and the track center CTCan of the innermost band track CTRan are separated at a track pitch BTP between normal recording bands in the radial direction. The tracks CTRb0 to CTRbn may be arranged at different track pitches in the radial direction. In FIG. 5, for convenience of description, the normal recording band area CBA and the shingled recording band area SBA are illustrated in a rectangular shape extending in the circumferential direction, but actually, are curved along the circumferential direction.

In the example illustrated in FIG. 5, when the recording area management unit 620 arranges two normal recording band areas CBAa and CBAb that are adjacent in the radial direction, the read/write control unit 610 writes the innermost band track CTRan in the normal recording band area CBAa at the track pitch BTP between normal recording bands outward from the outermost band track CTRb0 in the normal recording band area CBAb.

In the example illustrated in FIG. 5, when arranging two normal recording band areas CBAa and CBAb that are adjacent in the radial direction, the recording area management unit 620 writes the outermost band track CTRbn in the normal recording band area CBAb at the track pitch BTP between normal recording bands inward from the innermost band track CTRan of the normal recording band area CBAa via the read/write control unit 610.

Figure 6:
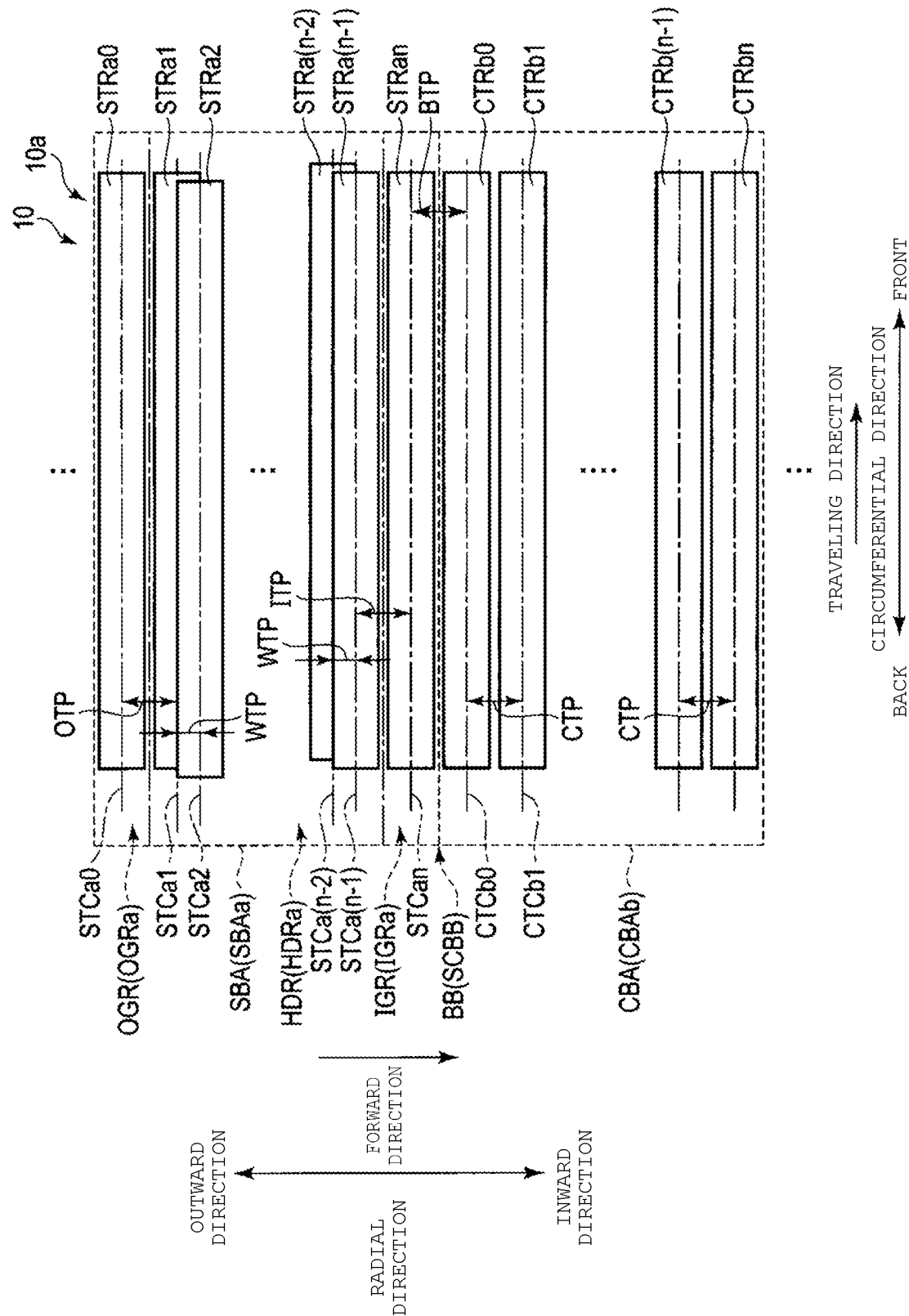
FIG. 6 is a schematic diagram illustrating an arrangement of a shingled recording band area and a normal recording band area that are adjacent in the radial direction.

FIG. 6 is a schematic diagram illustrating an arrangement of the shingled recording band area SBA and the normal recording band area CBA that are adjacent in the radial direction. In FIG. 6, the shingled recording band area SBA includes a shingled recording band area SBAa. In FIG. 6, the shingled recording band area SBAa and the normal recording band area CBAb are adjacent to each other in the radial direction. FIG. 6 illustrates an inter-band boundary BB between the shingled recording band area SBAa and the normal recording band area CBAb (hereinafter, may be referred to as a shingled/normal recording band boundary SCBB). The configuration of the shingled recording band area SBAa is the same as that of the shingled recording band area SBA illustrated in FIG. 4.

In the example illustrated in FIG. 6, the normal recording band area SBAa includes a track STRa0, a track STRa1, a track STRa2, . . . , a track STRa(n−2), a track STRa(n−1), and a track STRan. In FIG. 6, the tracks STRa0 to STRan are arranged in the stated order in the inward direction. In FIG. 6, the tracks STRa1 to STRa(n−1) overlap in the forward direction. In FIG. 6, the track STRa0 corresponds to the outermost band track STRa0, and the track STRan corresponds to the innermost band track STRan. In FIG. 6, the track STRa1 of a plurality of overlapping tracks STRa1 to STRa(n−1) corresponds to the start track STRa1, and the track STRa(n−1) of a plurality of overlapping tracks STRa1 to STRa(n−1) corresponds to the last track STRa(n−1).

In FIG. 6, the shingled recording band area SBAa includes an outer guard area OGR (OGRa), an inner guard area IGR (IGRa), and a high recording density area HDR (HDRa) between the outer guard area OGRa and the inner guard area IGRa. In FIG. 6, the outermost band track STRa0 is arranged in the outer guard area OGRa. In FIG. 6, the innermost band track STRan is arranged in the inner guard area IGRa.

In FIG. 6, a track center STCa0 of the track STRa0, a track center STRa1 of the track STRa1, a track center STCa2 of the track STRa2, . . . , a track center STCa(n−2) of the track STRa(n−2), a track center STCa(n−1) of the track STRa(n−1), and a track center STCan of the track STRan are illustrated. For example, the track center STCa0 of the track STRa0 is separated from the track center STRa1 of the track STRa1 at the outer boundary track pitch OTP in the radial direction. For example, the track center STRa1 of the track STRa1 and the track center STCa2 of the track STRa2 are separated at the shingled recording track pitch WTP in the radial direction. For example, the track center STCa(n−2) of the track STRa(n−2) and the track center STCa(n−1) of the track STRa(n−1) are separated at the shingled recording track pitch WTP in the radial direction. The track center STCa(n−1) of the track STRa(n−1) and the track center STCan of the track STRan are separated at the inner boundary track pitch ITP in the radial direction. In FIG. 6, the track center STCan of the innermost band track STRan and the track center CTCb0 of the outermost band track CTRb0 are separated at the track pitch between shingled/normal recording bands BTP in the radial direction. In FIG. 6, for convenience of description, the normal recording band area CBA and the shingled recording band area SBA are illustrated in a rectangular shape extending in the circumferential direction, but actually, are curved along the circumferential direction.

In the example illustrated in FIG. 6, when the recording area management unit 620 arranges the shingled recording band area SBAa and the normal recording band area CBAb that are adjacent in the radial direction, the read/write control unit 610 writes the outermost band track STRa0 in the outer guard area OGRa of the shingled recording band area SBAa. The read/write control unit 610 writes the start track STRa1 in the high recording density area HDRa at the outer boundary track pitch OTP in the forward direction from the outermost band track STRa0.

The read/write control unit 610 executes shingled recording of a plurality of tracks STRa1 to STRa(n−1) from the start track STRa1 to the last track STRa(n−1) in the high recording density area HDRa in the forward direction at the shingled recording track pitch WTP. The read/write control unit 610 writes the innermost band track STRan in the inner guard area IGRa of the shingled recording band area SBAa at the inner boundary track pitch ITP in the forward direction from the last track STRa(n−1) and at the track pitch BTP between shingled/normal recording bands outward (that is, in a direction opposite to the forward direction) from the outermost band track CTRb0 of the normal recording band area CBAb.

In the example illustrated in FIG. 6, when the recording area management unit 620 arranges the shingled recording band area SBAa and the normal recording band area CBAb that are adjacent in the radial direction, the read/write control unit 610 writes the outermost band track CTRbn in the normal recording band area CBAb at the track pitch BTP between shingled/normal recording bands inward from the innermost band track STRan in the shingled recording band area SBAa.

Figure 7:
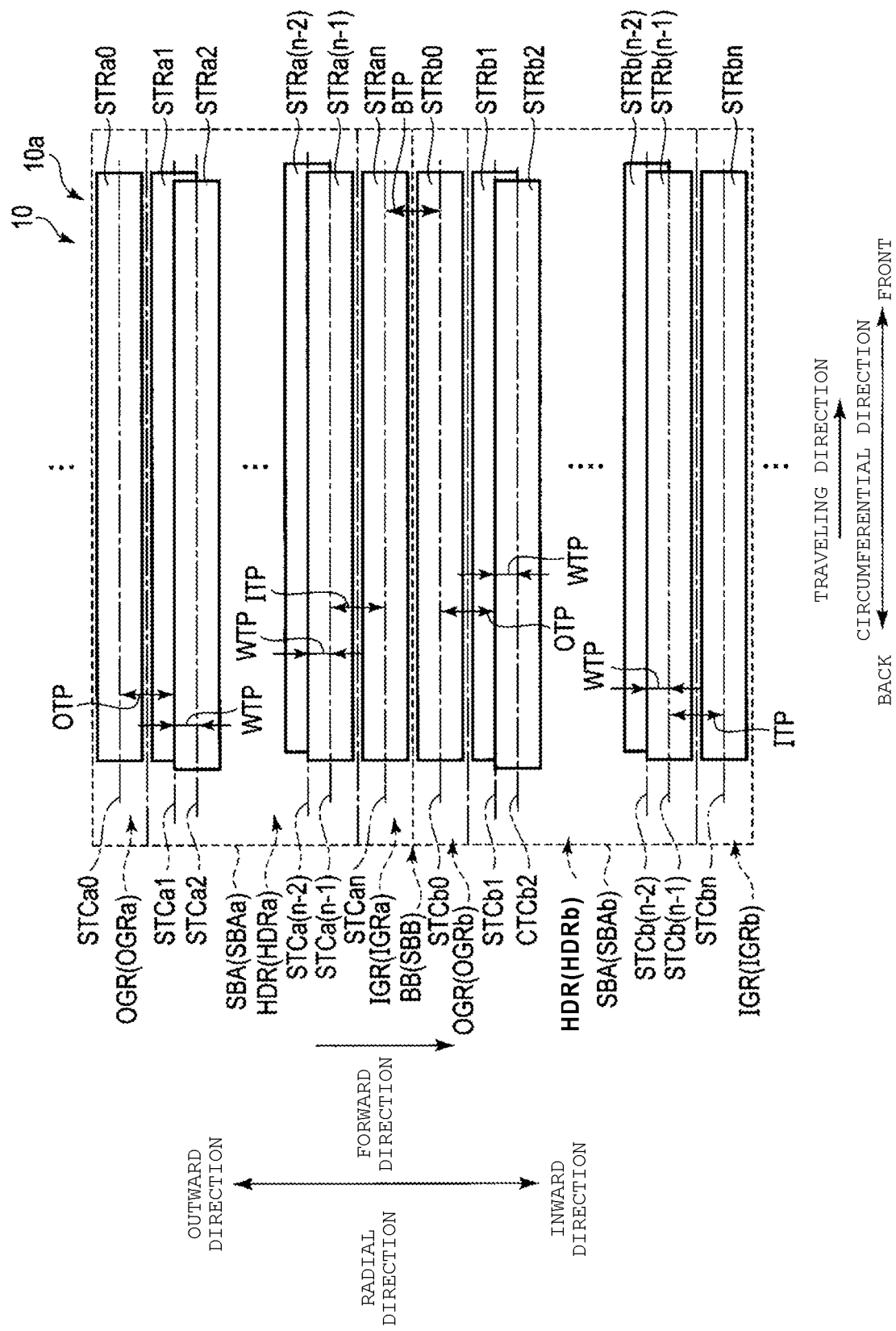
FIG. 7 is a schematic diagram illustrating an arrangement of a plurality of shingled recording band areas arranged in the radial direction.

FIG. 7 is a schematic diagram illustrating an arrangement of a plurality of shingled recording band areas SBA arranged in the radial direction. In FIG. 7, the shingled recording band area SBA includes two shingled recording band areas SBAa and shingled recording band areas SBAb that are adjacent in the radial direction. FIG. 7 illustrates the inter-band boundary BB between the shingled recording band area SBAa and the shingled recording band area SBAb (hereinafter, may be referred to as a shingled recording band boundary SBB). The configuration of the shingled recording band area SBAa is the same as that of the shingled recording band area SBA illustrated in FIG. 4.

In the example illustrated in FIG. 7, the shingled recording band area SBAb includes a track STRb0, a track STRb1, a track STRb2, . . . , a track STRb(n−2), a track STRb(n−1), and a track STRbn. In FIG. 7, the tracks STRb0 to STRbn are arranged in the stated order in the inward direction. In FIG. 7, tracks STRb1 to STRb(n−1) overlap in the forward direction. In FIG. 7, the track STRb0 corresponds to the outermost band track STRb0, and the track STRbn corresponds to the innermost band track STRbn. In FIG. 7, the track STRb1 of a plurality of overlapping tracks STRb1 to STRb(n−1) corresponds to the start track STRb1, and the track STRb(n−1) of a plurality of overlapping tracks STRb1 to STRb(n−1) corresponds to the last track STRb(n−1).

In FIG. 7, the shingled recording band area SBAb includes an outer guard area OGR (OGRb), an inner guard area IGR (IGRb), and a high recording density area HDR (HDRb) between the outer guard area OGRb and the inner guard area IGRb. In FIG. 7, the outermost band track STRb0 is arranged in the outer guard area OGRb. In FIG. 7, the innermost band track STRbn is arranged in the inner guard area IGRb.

In FIG. 7, a track center STCb0 of the track STRb0, a track center STCb1 of the track STRb1, a track center STCb2 of the track STRb2, . . . , a track center STCb(n−2) of the track STRb(n−2), a track center STCb(n−1) of the track STRb(n−1), and a track center STCbn of the track STRbn are illustrated. For example, the track center STCb0 of the track STRb0 and the track center STCb1 of the track STRb1 are separated at the outer boundary track pitch OTP in the radial direction. For example, the track center STCb1 of the track STRb1 and the track center STCb2 of the track STRb2 are separated at the shingled recording track pitch WTP in the radial direction. For example, the track center STCb(n−2) of the track STRb(n−2) and the track center STCb(n−1) of the track STRb(n−1) are separated at the shingled recording track pitch WTP in the radial direction. The track center STCb(n−1) of the track STRb(n−1) and the track center STCbn of the track STRbn are separated at the inner boundary track pitch ITP in the radial direction.

In FIG. 7, the track center STCan of the innermost band track STRan and the track center STCb0 of the outermost band track STRb0 are separated at the track pitch between shingled recording bands BTP in the radial direction. In FIG. 7, for convenience of description, the normal recording band area CBA and the shingled recording band area SBA are illustrated in a rectangular shape extending in the circumferential direction, but actually, are curved along the circumferential direction.

In the example illustrated in FIG. 7, when the recording area management unit 620 arranges two shingled recording band areas SBAa and SBAb that are adjacent in the radial direction, the read/write control unit 610 writes the innermost band track STRan in the inner guard area IGRa of the shingled recording band area SBAa at the inner boundary track pitch ITP in the forward direction from the last track STRa(n−1).

In the example illustrated in FIG. 7, when the recording area management unit 620 arranges two shingled recording band areas SBAa and SBAb that are adjacent in the radial direction, the read/write control unit 610 writes the outermost band track STRb0 in the outer guard area OGRb of the shingled recording band area SBAb at the track pitch BTP between shingled recording bands in the forward direction (here, the inward direction) from the innermost band track STRan of the shingled recording band area SBAa.

The read/write control unit 610 writes the start track STRb1 in the high recording density area HDRa at the outer boundary track pitch OTP in the forward direction from the outermost band track STRb0. The read/write control unit 610 executes shingled recording of the plurality of tracks STRb1 to STRb(n−1) from the start track STRb1 to the last track STRb(n−1) in the high recording density area HDRb at the shingled recording track pitch WTP in the forward direction. The read/write control unit 610 writes the innermost band track STRbn in the inner guard area IGRb of the shingled recording band area SBAb at the inner boundary track pitch ITP in the forward direction from the last track STRa(n−1).

Figure 8:
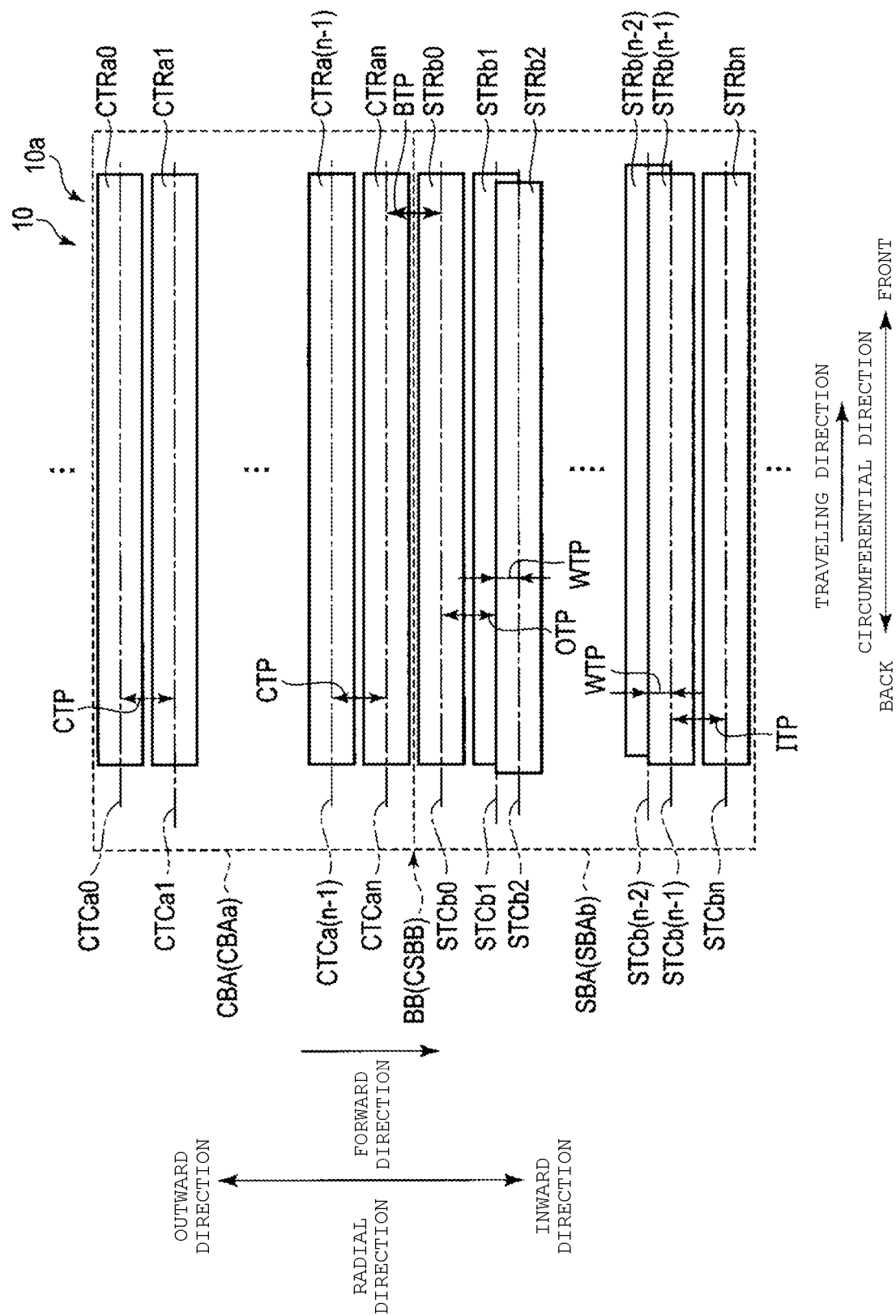
FIG. 8 is a schematic diagram illustrating an arrangement of a normal recording band area and a shingled recording band area that are adjacent in the radial direction.

FIG. 8 is a schematic diagram illustrating an arrangement of the normal recording band area CBA and the shingled recording band area SBA that are adjacent in the radial direction. In FIG. 8, the normal recording band area CBAa and the shingled recording band area SBAb are adjacent to each other in the radial direction. FIG. 8 illustrates the inter-band boundary BB between the normal recording band area CBAa and the shingled recording band area SBAb (hereinafter, may be referred to as a shingled/normal recording band boundary CSBB). In FIG. 8, for convenience of description, the normal recording band area CBA and the shingled recording band area SBA are illustrated in a rectangular shape extending in the circumferential direction, but actually, are curved along the circumferential direction.

In the example illustrated in FIG. 8, when the recording area management unit 620 arranges the normal recording band area CBAa and the shingled recording band area SBAb that are adjacent in the radial direction, the read/write control unit 610 writes the outermost band track STRb0 in the outer guard area OGRb of the shingled recording band area SBAb at the track pitch BTP between shingled/normal recording bands in the forward direction (here, the inward direction) from the innermost band track CTRan of the normal recording band area CBAa.

Figure 9:
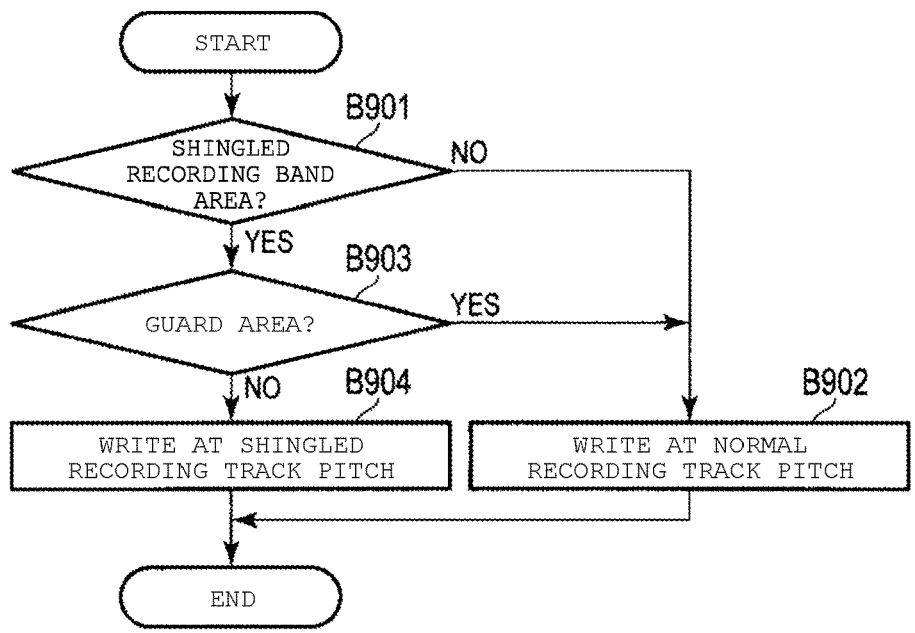
FIG. 9 is a flowchart of write processing according to a first embodiment.

FIG. 9 is a flowchart of write processing according to the present embodiment.

Initially, the MPU 60 determines whether a band area to be accessed or the like (hereinafter, referred to as a target band area) is the shingled recording band area SBA (B901). In other words, the MPU 60 determines whether the target band area is the shingled recording band area SBA or the normal recording band area CBA. When it is determined that the target band area is not the shingled recording band area SBA, that is, the target band area is the normal recording band area CBA (NO in B901), the MPU 60 writes data in the normal band area CBA at the normal recording track pitch (B902) and ends the processing.

When it is determined that the target band area is the shingled recording band area SBA (YES in B901), the MPU 60 determines whether an area to be accessed or the like (hereinafter, may be referred to as a target area) is a guard area or a non-guard area (B903). In other words, the MPU 60 determines whether the target area is a guard area (that is, a band boundary area) of the shingled recording band area SBA or a high recording density area HDR (that is, a non-band boundary area) of the shingled recording band area SBA. When it is determined that the target area is a guard area(YES in B903), the MPU 60 writes data in the guard area of the shingled recording band area SBA, for example, a band boundary at the normal recording track pitch (B902) and ends the processing. When it is determined that the target area is not a guard area, that is, the target area is the high recording density area HDR (NO in B903), the MPU 60 executes shingled recording of data in the high recording density area HDR of the shingled recording band area SBA at the shingled recording track pitch (B904) and ends the processing.

According to the present embodiment, the magnetic disk device 1 selectively executes normal recording processing and shingled recording processing. The magnetic disk device 1 executes normal recording of a plurality of tracks at the normal recording track pitch in the normal recording band area CBA. In the band boundary area of the shingled recording band area SBA, the magnetic disk device 1 writes a boundary band track at the track pitch between bands, for example, the normal recording track pitch, from a boundary band track of a band area adjacent in the radial direction. The magnetic disk device 1 writes a start track at a predetermined distance in the forward direction from the boundary band track in the non-band boundary area of the shingled recording band area SBA. The magnetic disk device 1 executes shingled recording of a plurality of tracks from the start track to the last track in the non-band boundary area of the shingled recording band area SBA in the forward direction at the shingled recording track pitch. The magnetic disk device 1 writes a boundary band track at a predetermined distance in the forward direction from the last track in the band boundary area of the shingled recording band area SBA. Even if the normal recording band area CBA and the shingled recording band area SBA are arranged adjacent to each other in the radial direction, the magnetic disk device 1 can equalize ATI and the like occurring in the mutual band areas. Therefore, the magnetic disk device 1 can evaluate the influence of ATI or the like occurring in the band areas adjacent in the radial direction without depending on whether the area is the normal recording band area CBA or the shingled recording band area SBA. That is, the magnetic disk device 1 can simplify management of the influence of ATI or the like occurring between a plurality of band areas adjacent in the radial direction. Therefore, the magnetic disk device 1 can improve reliability.

Next, magnetic disk devices according to other embodiments and other modification examples will be described. In other embodiments and other modification examples, the same parts as those in the above-described embodiment are denoted by the same reference numerals, and detailed description thereof will be omitted.

Modification Example

The magnetic disk device 1 of a modification example differs from the magnetic disk device 1 of the first embodiment in a write processing method.

Figure 10:
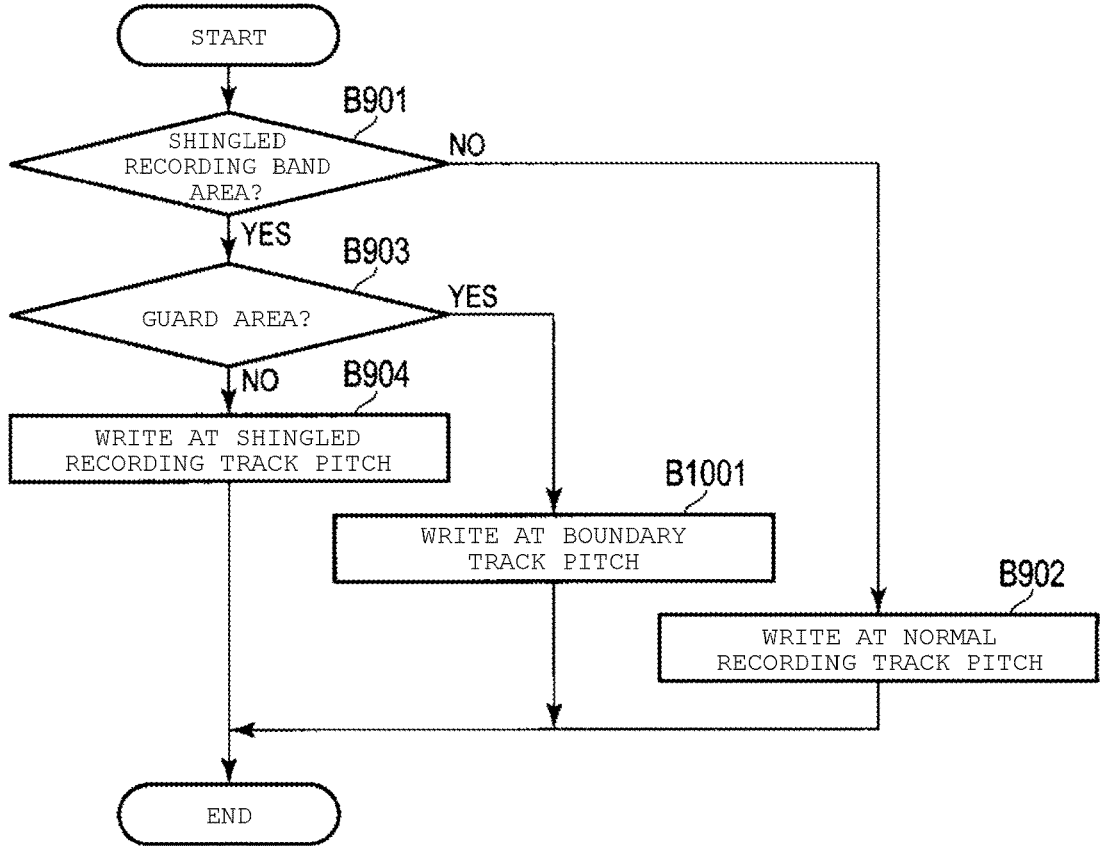
FIG. 10 is a flowchart of write processing according to a first modification example.

FIG. 10 is a flowchart of write processing according to the modification example.

The MPU 60 determines whether a target band area is the shingled recording band area SBA or the normal recording band area CBA (B901). When it is determined that the target band area is the shingled recording area SBA (YES in B901), the MPU 60 determines whether the target area is a guard area or a high recording density area HDR (B903). When it is determined that the target area is a guard area (B903), the MPU 60 writes data in the guard area of the shingled recording band area SBA at the boundary track pitch (B1001) and ends the processing. In other words, when it is determined that the target area is a band boundary area, the MPU 60 writes data in the band boundary area of the shingled recording band area SBA at the boundary track pitch and ends the processing.

According to the modification example, the magnetic disk device 1 writes the start track at the boundary track pitch in the forward direction from the boundary band track in the non-band boundary area of the shingled recording band area SBA. The magnetic disk device 1 executes shingled recording of a plurality of tracks from the start track to the last track in the non-band boundary area of the shingled recording band area SBA in the forward direction at the shingled recording track pitch. Even if the normal recording band area CBA and the shingled recording band area SBA are arranged adjacent to each other in the radial direction, the magnetic disk device 1 can prevent ATI and the like from occurring in the mutual band areas. Therefore, the magnetic disk device 1 can improve reliability.

Second Embodiment

The configuration of the magnetic disk device 1 of a second embodiment is different from that of the magnetic disk device 1 of the first embodiment.

Figure 11:
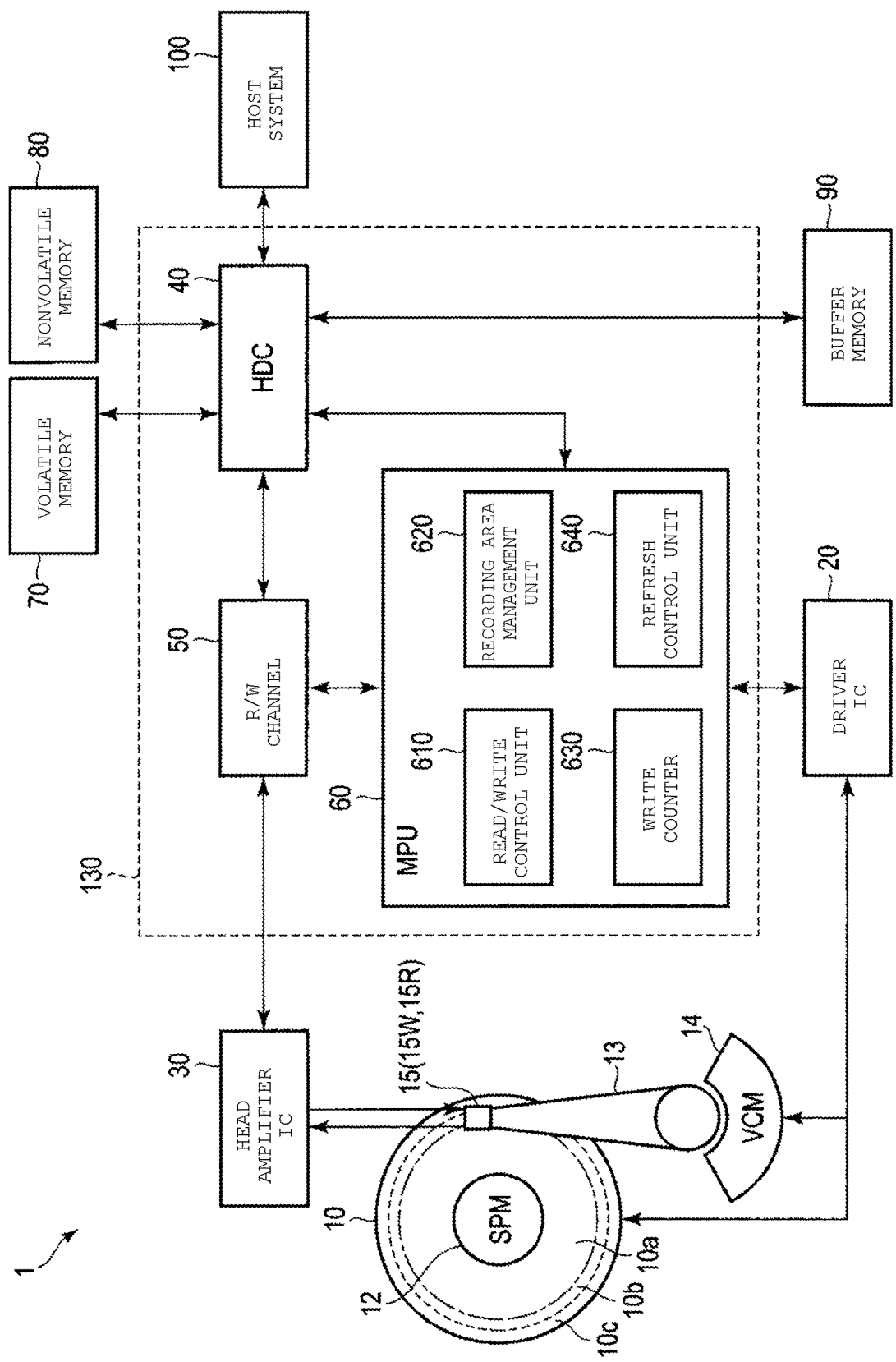
FIG. 11 is a block diagram illustrating a magnetic disk device according to a second embodiment.

FIG. 11 is a block diagram illustrating the magnetic disk device 1 according to the second embodiment.

The MPU 60 operates as a read/write control unit 610, a recording area management unit 620, a write retry counter 630, and a refresh control unit 640. For example, the MPU 60 executes firmware to perform functions of the read/write control unit 610, the recording area management unit 620, the write retry counter 630, the refresh control unit 640, and the like. Alternatively, one or more of those functions may be performed by one or more circuits.

In a predetermined zone, the read/write control unit 610 writes the boundary band track closest to the boundary of this zone (hereinafter, may be referred to as a zone boundary), that is, in the band boundary area of the shingled recording band area SBA (hereinafter, may be referred to as a boundary shingled recording band area) arranged at both ends of the predetermined zone. The read/write control unit 610 writes the first boundary area band track at a boundary track pitch in the forward direction from the boundary band track in the band boundary area of the boundary shingled recording band area SBA. The read/write control unit 610 writes at least one boundary area band track from the first boundary area band track to the last boundary area band track at the boundary track pitch in the forward direction in the band boundary area of the boundary shingled recording band area SBA. The read/write control unit 610 writes the start track at a boundary track pitch in the forward direction from the last boundary area band track in the non-band boundary area of the boundary shingled recording band area SBA. The read/write control unit 610 executes shingled recording of a plurality of tracks from the start track to the last track at the shingled recording track pitch in the forward direction in the non-band boundary area of the boundary shingled recording band area SBA. The read/write control unit 610 writes the first boundary area band track at a boundary track pitch in the forward direction from the last track in the band boundary area of the boundary shingled recording band area SBA. The read/write control unit 610 writes at least one boundary area band track from the first boundary area band track to the last boundary area band track at the boundary track pitch in the forward direction in the band boundary area of the boundary shingled recording band area SBA. The read/write control unit 610 writes a boundary band track at a boundary track pitch in the forward direction from the last boundary area band track in the band boundary area of the boundary shingled recording band area SBA.

The read/write control unit 610 writes a boundary band track in a band boundary area of the boundary shingled recording band area SBA in a predetermined zone. The read/write control unit 610 writes the start track at a boundary track pitch in the forward direction from the boundary band track in the non-band boundary area of the boundary shingled recording band area SBA. The read/write control unit 610 executes shingled recording of a plurality of tracks from the start track to the last track at the shingled recording track pitch in the forward direction in the non-band boundary area of the boundary shingled recording band area SBA. The read/write control unit 610 writes a boundary band track at the boundary track pitch from the last track in the band boundary area of the boundary shingled recording band area SBA.

In a predetermined zone, in a shingled recording band area other than the boundary shingled recording band area SBA (hereinafter, may be referred to as a standard shingled recording band area), the read/write control unit 610 executes shingled recording of a plurality of tracks in the forward direction from the start track to the last track at a shingled recording track pitch.

For example, the read/write control unit 610 writes the outermost band track in a predetermined zone, in the outermost band boundary area between the boundary closest to the outer zone boundary (hereinafter, may be referred to as an outer zone boundary) of this zone, that is, the outermost boundary shingled recording band area SBA (hereinafter, may be referred to as an outer boundary shingled recording band area or boundary shingled recording band area) and the boundary closest to the inner zone boundary (hereinafter, may be referred to as an inner zone boundary) of this zone, that is, the innermost boundary shingled recording band area SBA (hereinafter, may be referred to as an inner boundary shingled recording band area or boundary shingled recording band area).

In the outermost band boundary area of the outer boundary shingled recording band area SBA and the inner boundary shingled recording band area SBA, the read/write control unit 610 writes the first outer boundary area band track at a boundary track pitch in the forward direction (here, the inward direction) from the outermost band track. In the outermost band boundary area of the outer boundary shingled recording band area SBA and the inner boundary shingled recording band area SBA, the read/write control unit 610 writes at least one boundary area band track from the first outer boundary area band track to the last outer boundary area band track at the boundary track pitch in the forward direction.

In the non-band boundary area of the outer boundary shingled recording band area SBA and the inner boundary shingled recording band area SBA, the read/write control unit 610 writes the start track at the boundary track pitch in the forward direction from the last outer boundary area band track. In the non-band boundary area of the outer boundary shingled recording band area SBA and the inner boundary shingled recording band area SBA, the read/write control unit 610 executes shingled recording of a plurality of tracks from the start track to the last track at a shingled recording track pitch in the forward direction.

In the innermost band boundary area of the outer boundary shingled recording band area SBA and the inner boundary shingled recording band area SBA, the read/write control unit 610 writes the first inner boundary area band track at the boundary track pitch in the forward direction from the last track. In the innermost band boundary area of the outer boundary shingled recording band area SBA and the inner boundary shingled recording band area SBA, the read/write control unit 610 writes at least one boundary area band track from the first inner boundary area band track to the last inner boundary area band track at the boundary track pitch in the forward direction. In the innermost band boundary area of the outer boundary shingled recording band area SBA and the inner boundary shingled recording band area SBA, the read/write control unit 610 writes the innermost band track at a boundary track pitch in the forward direction from the last inner boundary area band track.

For example, the read/write control unit 610 writes the innermost band track in the innermost band boundary area of the outer boundary shingled recording band area SBA and the inner boundary shingled recording band area SBA in a predetermined zone. In the innermost band boundary area of the outer boundary shingled recording band area SBA and the inner boundary shingled recording band area SBA, the read/write control unit 610 writes the first outer boundary area band track at a boundary track pitch in the forward direction (here, the outward direction) from the innermost band track. In the innermost band boundary area of the outer boundary shingled recording band area SBA and the inner boundary shingled recording band area SBA, the read/write control unit 610 writes at least one boundary area band track from the first outer boundary area band track to the last outer boundary area band track at the boundary track pitch in the forward direction.

In the non-band boundary area of the outer boundary shingled recording band area SBA and the inner boundary shingled recording band area SBA, the read/write control unit 610 writes the start track at the boundary track pitch in the forward direction from the last inner boundary area band track. In the non-band boundary area of the outer boundary shingled recording band area SBA and the inner boundary shingled recording band area SBA, the read/write control unit 610 executes shingled recording of a plurality of tracks from the start track to the last track at a shingled recording track pitch in a forward direction.

In the outermost band boundary area of the outer boundary shingled recording band area SBA and the inner boundary shingled recording band area SBA, the read/write control unit 610 writes the first outer boundary area band track at the boundary track pitch in the forward direction from the last track. In the outmost band boundary area of the outer boundary shingled recording band area SBA and the inner boundary shingled recording band area SBA, the read/write control unit 610 writes at least one boundary area band track from the first outer boundary area band track to the last outer boundary area band track at the boundary track pitch in the forward direction (here, the outward direction). In the outermost band boundary area of the outer boundary shingled recording band area SBA, the read/write control unit 610 writes the outermost band track at the boundary track pitch in the forward direction (here, the outward direction) from the last outer boundary area band track.

For example, the read/write control unit 610 writes the outermost band track in the outermost band boundary area of the outer boundary shingled recording band area SBA and the inner boundary shingled recording band area SBA in a predetermined zone. In the non-band boundary area of the outer boundary shingled recording band area SBA and the inner boundary shingled recording band area SBA, the read/write control unit 610 writes the start track at the boundary track pitch in the forward direction (here, the inward direction) from the outermost band track. In the non-band boundary area of the outer boundary shingled recording band area SBA and the inner boundary shingled recording band area SBA, the read/write control unit 610 executes recording of a plurality of tracks from the start track to the last track at a shingled recording track pitch in the forward direction. In the innermost band boundary area of the outer boundary shingled recording band area SBA and the inner boundary shingled recording band area SBA, the read/write control unit 610 writes the innermost band track at a boundary track pitch in the forward direction (here, the inward direction) from the last track.

For example, the read/write control unit 610 writes the innermost band track in the innermost band boundary area of the outer boundary shingled recording band area SBA and the inner boundary shingled recording band area SBA in a predetermined zone. In the non-band boundary area of the outer boundary shingled recording band area SBA and the inner boundary shingled recording band area SBA, the read/write control unit 610 writes the start track at the boundary track pitch in the forward direction (here, the outward direction) from the innermost band track. In the non-band boundary area of the outer boundary shingled recording band area SBA and the inner boundary shingled recording band area SBA, the read/write control unit 610 executes recording of a plurality of tracks from the start track to the last track at a shingled recording track pitch in a forward direction. In the outermost band boundary area of the outer boundary shingled recording band area SBA and the inner boundary shingled recording band area SBA, the read/write control unit 610 writes the outermost band track at a boundary track pitch in the forward direction (here, the outward direction) from the last track.

Figure 12:
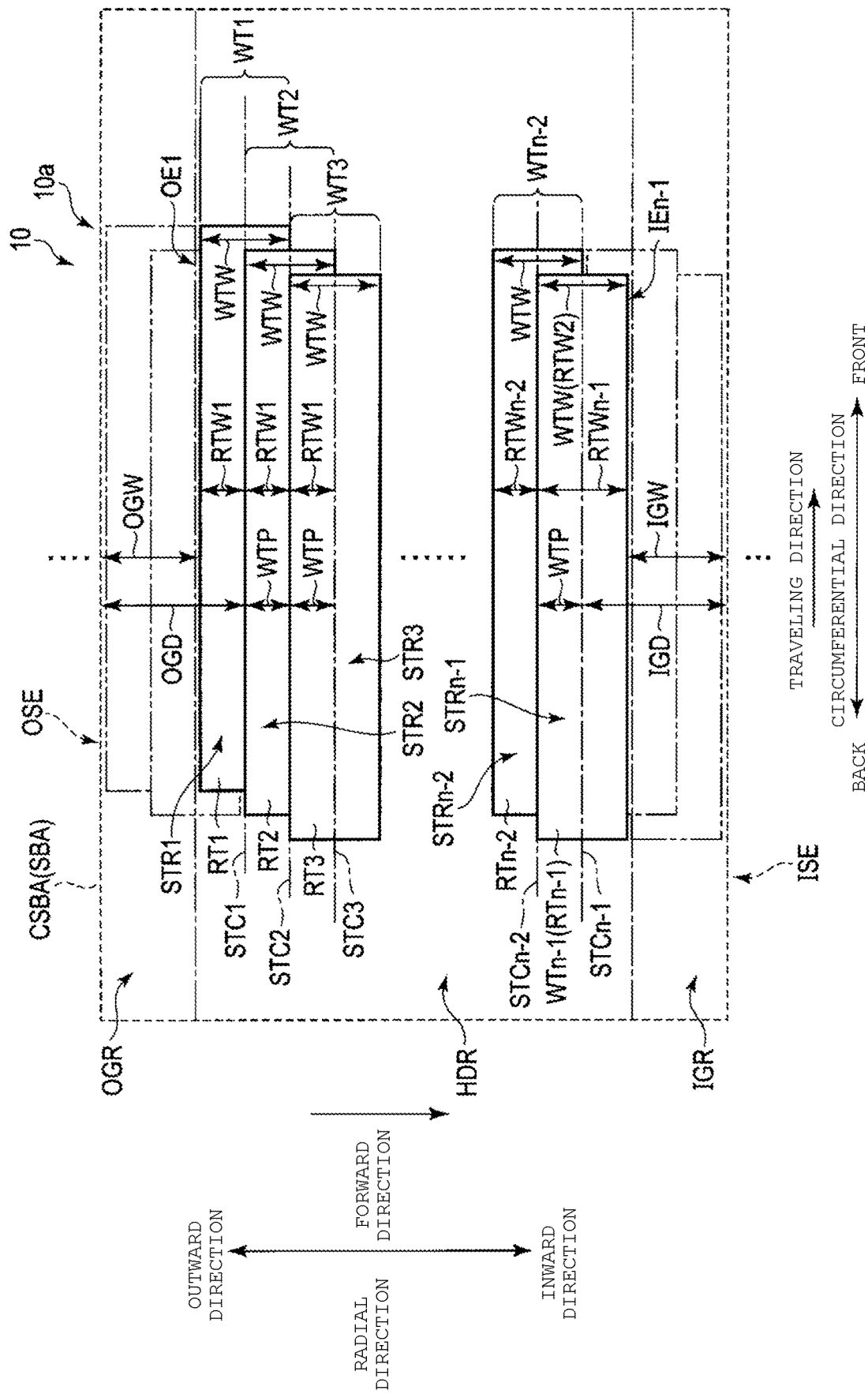
FIG. 12 is a schematic diagram illustrating shingled recording processing in a standard shingled recording band area.

FIG. 12 is a schematic diagram illustrating shingled recording processing in a standard shingled recording band area SBA. The shingled recording band area SBA includes, for example, a standard shingled recording band area CSBA. In the example illustrated in FIG. 12, the write track WT1 is separated from the outer band boundary OSE of the shingled recording band area SBA by a predetermined distance OGD (hereinafter, may be referred to as an outer guard distance OGD) in the forward direction (here, the inward direction). For example, the outer band boundary OSE and the track center STC1 of the write track WT1 are separated by the outer guard distance OGD in the radial direction. The outer guard distance OGD is larger than the outer guard area width OGW, for example. For example, the outer guard distance OGD corresponds to a distance equal to or longer than the distance obtained by adding one-half of the write track width WTW to the outer guard area width OGW. The write track WTn−1 is separated from the inner band boundary ISE of the shingled recording band area by a predetermined distance IGD (hereinafter, may be referred to as an inner guard distance IGD) in a direction opposite to the forward direction (here, the outward direction). For example, the inner band boundary ISE and the track center STCn−1 of the write track WTn−1 are separated by the inner guard distance IGD in the radial direction. The inner guard distance IGD is larger than the inner guard area width IGW, for example. For example, the inner guard distance IGD corresponds to a distance equal to or longer than the distance obtained by adding one-half of the write track width WTW to the inner guard area width IGW.

In the example illustrated in FIG. 12, the read/write control unit 610 writes the track STR1 (write track WT1), the track STR2 (write track WT2), the track STR3 (write track WT3), . . . , the track STRn−2 (Write track WTn−2), and the track STRn−1 (write track WTn−1) in the shingled recording band area SBA of the user data area 10a in the forward direction in the stated order in an overlapping manner.

In the example illustrated in FIG. 12, in the high recording density area HDR of the standard shingled recording band area CSBA (SBA) of the user data area 10a, the read/write control unit 610 positions the head 15 at the track center STC1 separated from the outer band boundary OSE by the outer guard distance OGD in the forward direction (here, the inward direction) and writes the write track WT1 (here, start track STR1).

In the example illustrated in FIG. 12, the read/write control unit 610 positions the head 15 at the track center STC2 which is separated from the track center STC1 of the write track WT1 at the track pitch WTP in the forward direction (here, the inward direction) in the high recording density area HDR of the standard shingled recording band area CSBA, and executes shingled recording of the write track WT2 on the write track WT1 in an overlapping manner. The read/write control unit 610 positions the head 15 at the track center STC3 which is separated from the track center STC2 of the write track WT2 at the track pitch WTP in the forward direction in the high recording density area HDR of the standard shingled recording band area CSBA, and executes shingled recording of the write track WT3 on the write track WT2 in an overlapping manner.

In the example illustrated in FIG. 12, in the high recording density area HDR of the standard shingled recording band area CSBA, the read/write control unit 610 positions the head 15 at the track center STCn−1 which is separated from the track center STCn−2 of the write track WTn−2 at the track pitch WTP in the forward direction and is separated from the inner band boundary ISE by the inner guard distance IGD in the direction (here, the outward direction) opposite to the forward direction (here, the inward direction), and executes shingled recording of the write track WTn−1 (last track STRn−1) on the write track WTn−2 in an overlapping manner.

In other words, in the standard shingled recording band area CSBA, the read/write control unit 610 executes shingled recording of a plurality of tracks in the forward direction from the write track WT1 (start track STR0) to the write track WTn−1 (last track STRn−1) in the high recording density area HDR without writing data in the guard areas (that is, outer guard area OGR and inner guard area IGR).

The write retry counter 630 counts the number of times (retries) the processing of writing the same data to the same area again has been executed/retried. The write retry counter 630 counts the number of retries for each predetermined area, for example, for each track, each band area, or each zone.

The write retry counter 630 counts the number of retries in a predetermined area and the number of retries in an area where an ATI or the like occurs when write is performed in this area. The write retry counter 630 counts the number of retries in a band boundary area of a predetermined band area and the number of retries in a band boundary area adjacent to the band boundary area.

For example, the write retry counter 630 counts the number of retries of the outermost band track in a predetermined band area and the number of retries of the innermost band track in a band area adjacent to the outside of this band area. For example, the write retry counter 630 counts the number of retries of the innermost band track in a predetermined band area and the number of retries of the outermost band track in a band area adjacent to the inside of this band area. The write retry counter 630 may record the number of retries in a predetermined area, for example, for each track, as a table in a predetermined recording area, for example, the system area 10c of the disk 10, the nonvolatile memory 80, or the like.

For example, the write retry counter 630 counts the number of retries of a boundary band track closest to a zone boundary in a predetermined zone, that is, a band area (hereinafter, may be referred to as a zone boundary band area) arranged at both ends of the predetermined zone. In other words, the write retry counter 630 counts the number of retries of the boundary band track in two adjacent zone boundary band areas with the zone boundary of two zones that are adjacent in the radial direction interposed therebetween.

When a command (e.g., reset write pointer) for returning a pointer indicating the position of the write processing to the initial position of the band area in a predetermined band area is received, or when the change of the predetermined band area (e.g., media conversion) is executed, since there is no valid data in the predetermined band area, the write retry counter 630 resets the number of retries in this band area, for example, to 0. Here, the reset write pointer corresponds to a command specified by the standard.

When the number of retries in a predetermined area exceeds a threshold corresponding to this area (hereinafter, may be referred to as a refresh threshold), the write retry counter 630 may set a flag for executing refresh processing in this area.

In a predetermined area, when the number of retries exceeds a refresh threshold corresponding to this area, the refresh control unit 640 executes processing of reading data written in this area and rewriting the same in the same area (hereinafter, may be referred to as refresh processing). If the flag is set in the predetermined area, the refresh control unit 640 determines that the number of retries in this area exceeds a refresh threshold corresponding to this area and sets this area as an area where refresh processing is to be executed (hereinafter, may be referred to as a refresh area). The refresh control unit 640 saves the data written in the refresh area to a predetermined recording area, for example, the system area 10c, the volatile memory 70, the nonvolatile memory 80, the buffer memory 90, or the like. After saving the data written in this area to the predetermined recording area, the refresh control unit 640 performs the refresh processing on this area at a timing when the refresh processing can be executed, for example, at the time of idling. The refresh control unit 640 clears the flag after executing the refresh processing on this area.

For example, in the normal recording band area CBA, when the number of retries in a predetermined area exceeds a refresh threshold (hereinafter, may be referred to as a normal recording band threshold) set in the normal recording band area CBA, the refresh control unit 640 executes refresh processing in the entire area (or all tracks) of the normal recording band area CBA. In the normal recording band area CBA, when the number of retries in a predetermined area exceeds a refresh threshold set in the predetermined area, the refresh control unit 640 may execute refresh processing on a predetermined radial area including the predetermined area.

For example, in the shingled recording band area SBA, when the number of retries in a predetermined area exceeds a refresh threshold set in the shingled recording band area SBA (hereinafter, may be referred to as a shingled recording band threshold), the refresh control unit 640 executes refresh processing on the entire area (or all tracks) of the shingled recording band area SBA. In the shingled recording band area SBA, when the number of retries in a predetermined area exceeds a shingled recording band threshold, the refresh control unit 640 may execute refresh processing on a predetermined radial area including the predetermined area.

Figure 13:
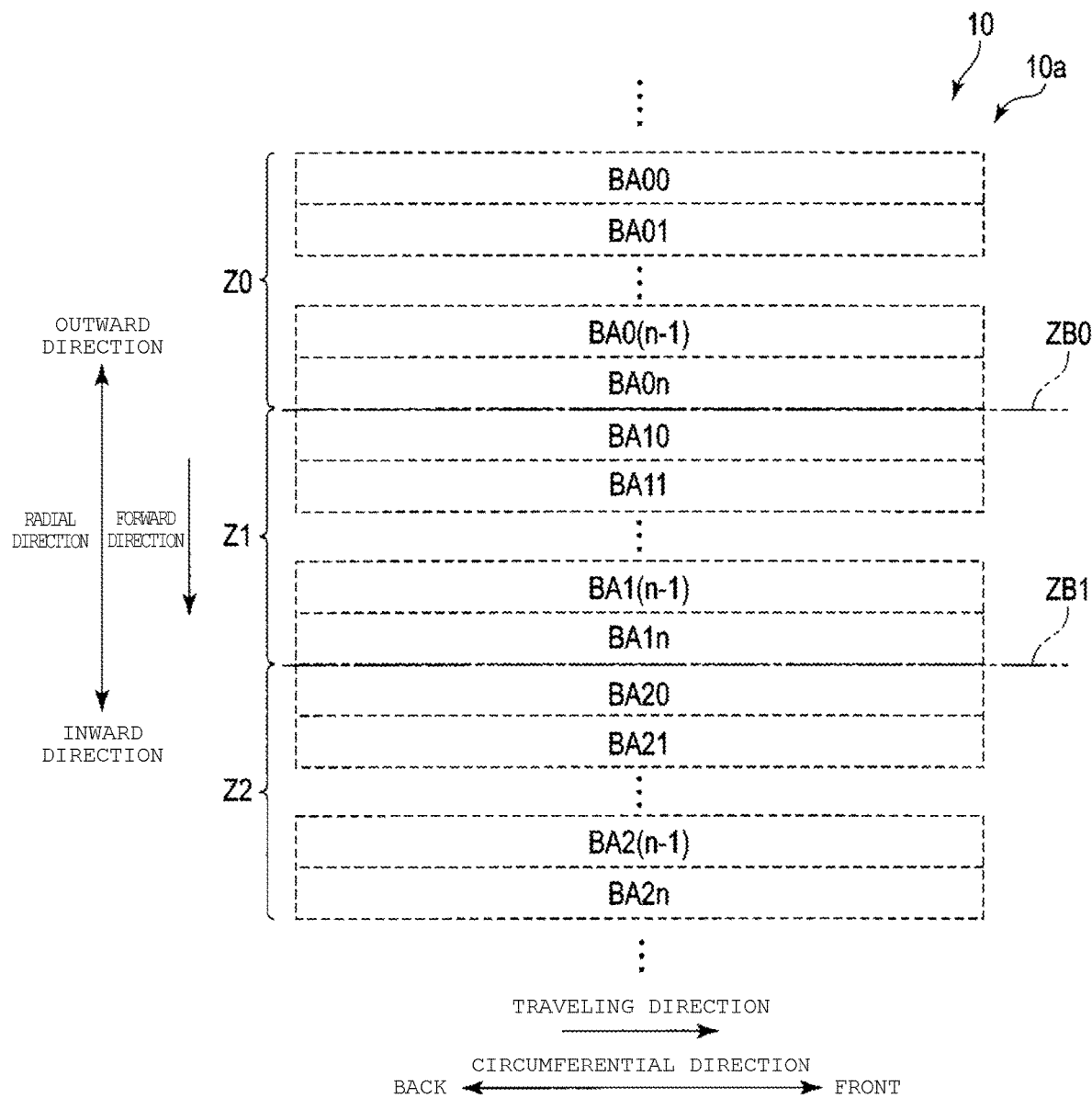
FIG. 13 is a schematic diagram illustrating an arrangement of zones.

FIG. 13 is a schematic diagram illustrating an arrangement of zones. FIG. 13 illustrates zones Z0, Z1, and Z2 continuously arranged in the radial direction. In FIG. 13, the zones Z0 and Z1 are adjacent in the radial direction, and the zones Z1 and Z2 are adjacent in the radial direction. FIG. 13 illustrates a zone boundary ZB0 between the zones Z0 and Z1, and a zone boundary ZB1 between the zones Z1 and Z2. The zone Z0 includes band areas BA00, BA01, . . . , BA0(n-1), and BA0n. The band areas BA00, BA01, . . . , BA0(n-1), and BA0n are arranged in the stated order from the outside to the inside. For example, in the zone Z0, the band BA0n corresponds to the inner boundary shingled recording band area BA0n (SBA).

For example, in the zone Z0, the band areas BA00 to BA0(n-1) correspond to the standard shingled recording band area CSBA or the normal recording band area CBA. The zone Z1 includes band areas BA10, BA11, . . . , BA1(n-1), and BA1n. The band areas BA10, BA11, . . . , BA1(n-1), and BA1n are arranged in the stated order in the inward direction. For example, in the zone Z1, the band BA10 corresponds to the outer boundary shingled recording band area BA10 (SBA), and the band area BA1n corresponds to the inner boundary shingled recording band area BA1n (SBA). Further, for example, in the zone Z1, the band areas BA11 to BA1(n-1) correspond to the standard shingled recording band area CSBA or the normal recording band area CBA. The zone Z2 includes band areas BA20, BA21, . . . , BA2(n-1), and BA2n. The band areas BA20, BA21, . . . , BA2(n-1), and BA2n are arranged in the stated order from the outward direction to the inward direction. For example, in zone 2, the band BA20 corresponds to the outer boundary shingled recording band area BA20 (SBA). Further, for example, in the zone Z2, the band areas BA21 to BA2n correspond to the standard shingled recording band area CSBA or the normal recording band area CBA.

In the example illustrated in FIG. 13, the read/write control unit 610 writes each track as illustrated in FIG. 4 in the inner boundary shingled recording band area BA0n closest to the zone boundary ZB0 in the zone Z0, that is, arranged at the end in the inward direction. The read/write control unit 610 writes each track as illustrated in FIG. 4 in the outer boundary shingled recording band area BA10 closest to the zone boundary ZB0 in the zone Z1, that is, arranged at the end in the outward direction. The read/write control unit 610 writes each track as illustrated in FIG. 4 in the inner boundary shingled recording band area BA1n closest to the zone boundary ZB1 in the zone Z1, that is, arranged at the end in the inward direction. The read/write control unit 610 writes each track as illustrated in FIG. 4 in the outer boundary shingled recording band area BA20 closest to the zone boundary ZB1 in the zone Z2, that is, arranged at the end in the outward direction.

FIG. 14 is a diagram illustrating a table TB1 for storing the number of retries according to the second embodiment. The table TB1 illustrated in FIG. 14 corresponds to, for example, FIG. 13. In FIG. 14, the table TB1 includes a zone boundary, a zone, a band area, and the number of retries. In the table TB1, the number of retries in the band area BA0n corresponds to, for example, the number of retries of the innermost band track in the boundary shingled recording band area BA0n. The number of retries in the band area BA0n may correspond to, for example, the number of retries of some tracks in the zone boundary ZB0 side of the inner boundary shingled recording band area BA0n. In the table TB1, the number of retries in the outer boundary shingled recording band area BA10 corresponds to, for example, the number of retries of the outermost band track in the outer boundary shingled recording band area BA10. The number of retries in the band area BA10 may correspond to, for example, the number of retries of some tracks in the zone boundary ZB0 side of the outer boundary shingled recording band area BA10. In the table TB1, the number of retries in the boundary shingled recording band area BA1n corresponds to, for example, the number of retries of the innermost band track in the inner boundary shingled recording band area BA1n. The number of retries in the band area BA1n may correspond to, for example, the number of retries of some tracks in the zone boundary ZB1 side of the inner boundary shingled recording band area BA1n. In the table TB1, the number of retries in the boundary shingled recording band area BA20 corresponds to, for example, the number of retries of the outermost band track in the outer boundary shingled recording band area BA20. The number of retries in the band area BA20 may correspond to, for example, the number of retries of some tracks in the zone boundary ZB1 side of the outer boundary shingled recording band area BA20.

In the example illustrated in FIG. 14, when write retry processing is executed a predetermined number of times, for example, 10 times, on the innermost band track of the inner boundary shingled recording band area BA0n, the write retry counter 630 increases the number of retries in the inner boundary shingled recording band area BA0n and the number of retries in the outer boundary shingled recording band area BA10 of the table TB1 by ten.

In the example illustrated in FIG. 14, when the number of retries in the boundary shingled recording band area BA0n exceeds a refresh threshold for the inner boundary shingled recording band area BA0n, the refresh control unit 640 executes refresh processing in the inner boundary shingled recording band area BA0n and resets the number of retries in the inner boundary shingled recording band area BA0n, for example, to 0.

In the example illustrated in FIG. 14, when write retry processing is executed a predetermined number of times in the outermost band track of the outer boundary shingled recording band area BA10, the write retry counter 630 increases the number of retries in the outer boundary shingled recording band area BA10 and the number of retries in the inner boundary shingled recording band area BA0n of the table TB1 by the predetermined number.

In the example illustrated in FIG. 14, when the number of retries in the outer boundary shingled recording band area BA10 exceeds a refresh threshold for the outer boundary shingled recording band area BA10, the refresh control unit 640 executes refresh processing in the outer boundary shingled recording band area BA10 and resets the number of retries corresponding to the outer boundary shingled recording band area BA10, for example, to 0.

In the example illustrated in FIG. 14, when the write retry processing is executed a predetermined number of times in the innermost band track of the inner boundary shingled recording band area BA1n, the write retry counter 630 increases the number of retries in the inner boundary shingled recording band area BA1n and the number of retries in the outer boundary shingled recording band area BA20 of the table TB1 by the predetermined number.

In the example illustrated in FIG. 14, when the number of retries in the outer boundary shingled recording band area BA1n exceeds a refresh threshold for the outer boundary shingled recording band area BA1n, the refresh control unit 640 executes refresh processing on the outer boundary shingled recording band area BA1n and resets the number of retries in the outer boundary shingled recording band area BA1n, for example, to 0.

In the example illustrated in FIG. 14, when write retry processing is executed a predetermined number of times in the outermost band track of the outer boundary shingled recording band area BA20, the write retry counter 630 increases the number of retries in the outer boundary shingled recording band area BA20 and the number of retries in the inner boundary shingled recording band area BA1n of the table TB1 by the predetermined number.

In the example illustrated in FIG. 14, when the number of retries in the outer boundary shingled recording band area BA20 exceeds a refresh threshold for the outer boundary shingled recording band area BA20, the refresh control unit 640 executes refresh processing in the outer boundary shingled recording band area BA20 and resets the number of retries in the outer boundary shingled recording band area BA20, for example, to 0.

FIG. 15 is a schematic diagram illustrating the table TB1 when a reset write pointer is received or a media conversion is executed.

In the example illustrated in FIG. 15, when a reset write pointer is received for the inner boundary shingled recording band area BA0n or when a media conversion is performed, the write retry counter 630 resets the number of retries in the inner boundary shingled recording band area BA0n, for example, to 0.

Figure 16:
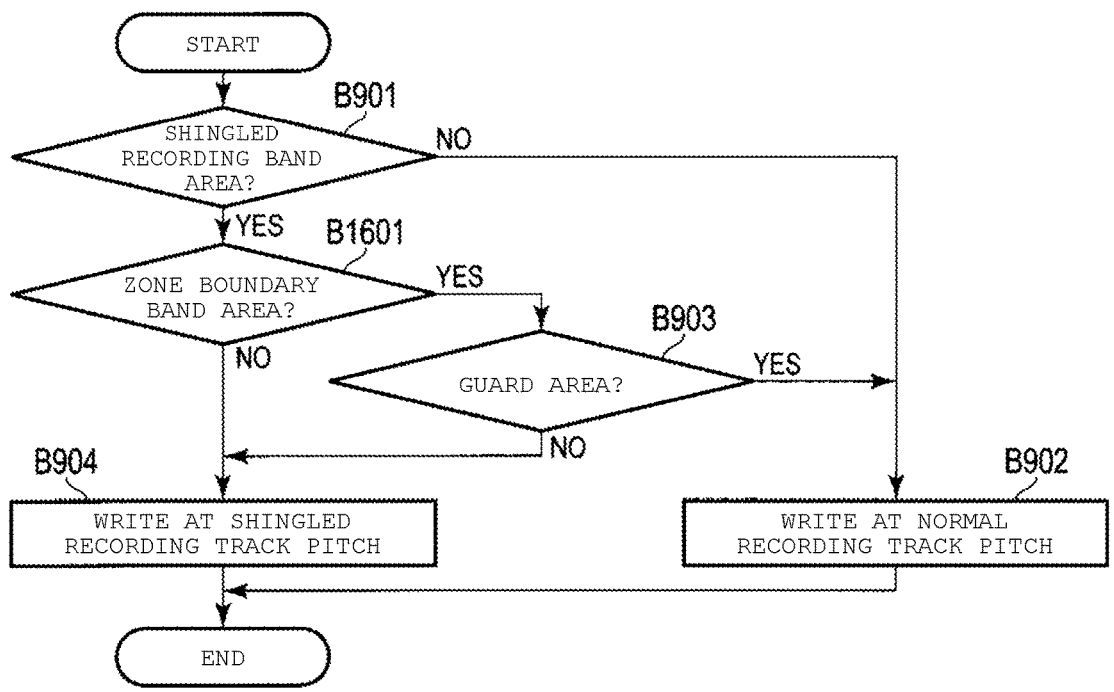
FIG. 16 is a flowchart of write processing according to a second embodiment.

FIG. 16 is a flowchart of write processing according to the second embodiment.

The MPU 60 determines whether predetermined processing, for example, a band area to be accessed or the like (hereinafter, may be referred to as a target band area) is a shingled recording band area SBA or a normal recording band area CBA (B901). When it is determined that the target band area is the shingled recording band area SBA (YES in B901), the MPU 60 determines whether the target band area is a zone boundary band area (B1601). When it is determined that the target band area is not the zone boundary band area (NO in B1601), the MPU 60 executes shingled recording of data in the high recording density area HDR at the shingled recording track pitch (B904), and ends the processing.

When it is determined that the target band area is a zone boundary band area (YES in B1601), the MPU 60 determines whether the target area is a guard area or a high recording density area HDR (B903). When it is determined that the target area is a guard area (YES in B903), the MPU 60 writes data in the guard area (a band boundary area) of the shingled recording band area SBA at the normal recording track pitch (B902), and ends the processing. When it is determined that the target area is the high recording density area HDR (NO in B903), the MPU 60 writes data in the high recording density area HDR of the shingled recording band area SBA at the shingled recording track pitch (B904), and ends the processing.

Figure 17:
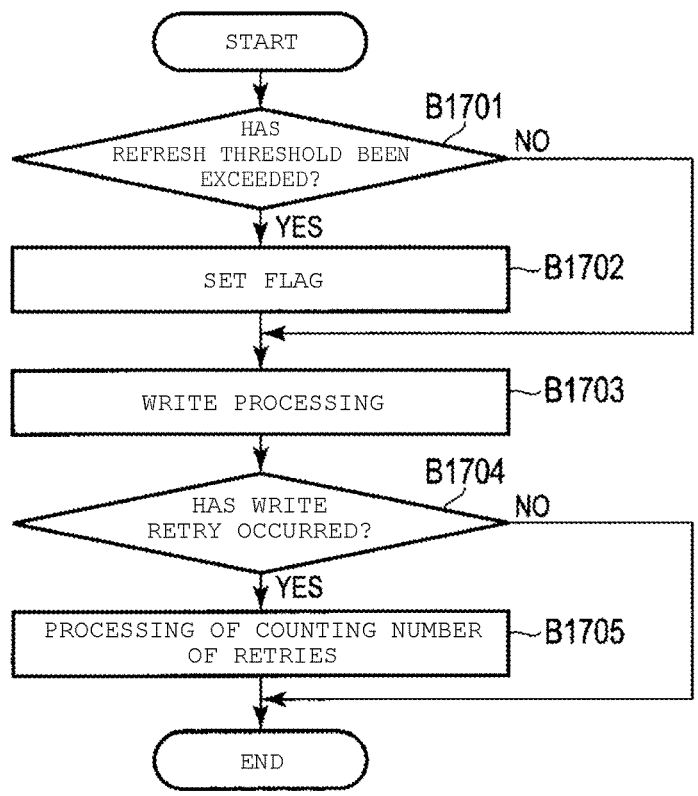
FIG. 17 is a flowchart of determination processing of refresh processing according to a second embodiment.

FIG. 17 is a flowchart illustrating determination processing of refresh processing according to the second embodiment.

The MPU 60 determines whether the number of retries in the target area is greater than a refresh threshold (B1701). When it is determined that the number of retries in the target area is equal to or less than the refresh threshold (NO in B1701), the MPU 60 proceeds to the processing of B1703. When it is determined that the number of retries in the target area has exceeded the refresh threshold (YES in B1701), the MPU 60 sets a flag for executing the refresh processing in the target area (B1702), and executes write processing in the target area (B1703). The MPU 60 determines whether a write retry has occurred in the target area (B1704). When it is determined that a write retry has not occurred (NO in B1704), the MPU 60 ends the processing. When it is determined that a write retry has occurred (NO in B1705), the MPU 60 executes processing of counting the number of retries in the area where the write retry has occurred (B1705), and ends the processing.

Figure 18:
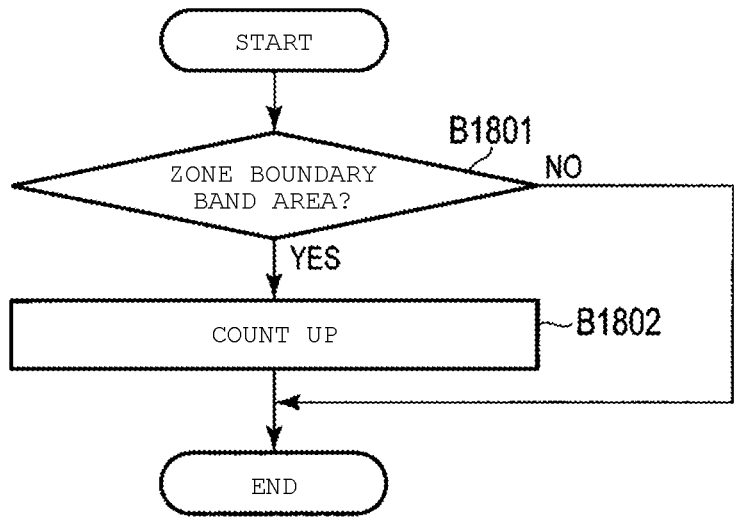
FIG. 18 is a flowchart of processing of counting the number of retries according to a second embodiment.

FIG. 18 is a flowchart of processing of counting the number of retries according to the second embodiment.

The MPU 60 determines whether the area where a write retry has occurred is a zone boundary band area (B1801). When it is determined that the area where a write retry has occurred is not the zone boundary band area (NO in B1801), the MPU 60 ends the processing. When it is determined that the area where a write retry has occurred is the zone boundary band area (YES in B1801), the MPU 60 counts up the number of retries in the area where the write retry has occurred, for example, increments the number of retries in the area where the write retry has occurred (B1802), and ends the processing.

Figure 19:
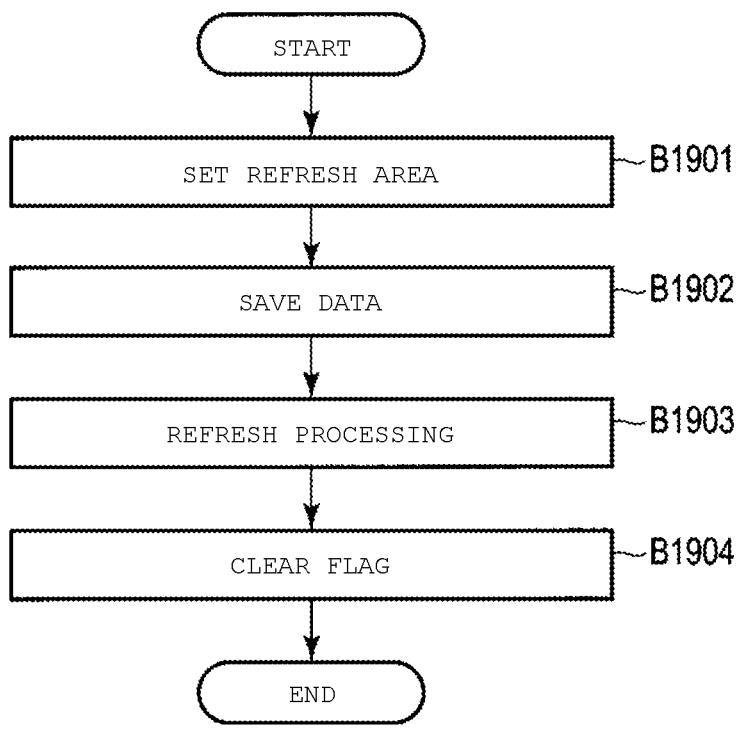
FIG. 19 is a flowchart illustrating refresh processing according to a second embodiment.

FIG. 19 is a flowchart of refresh processing according to the second embodiment.

The MPU 60 sets a predetermined radial area for which a flag has been set as a refresh area (B1901). The MPU 60 saves the data written in the refresh area to a predetermined recording area (B1902), executes the refresh processing in the refresh area (B1903), clears the flag (B1904), and ends the processing.

According to the second embodiment, the magnetic disk device 1 writes a boundary band track in a band boundary area of the boundary shingled recording band area SBA in a predetermined zone. The magnetic disk device 1 writes a start track at a predetermined distance in the forward direction from the boundary band track in the non-band boundary area of the boundary shingled recording band area SBA. The magnetic disk device 1 executes recording of a plurality of tracks from the start track to the last track in the forward direction at the shingled recording track pitch in the non-band boundary area of the boundary shingled recording band area SBA. The magnetic disk device 1 writes a boundary band track at a predetermined distance from the last track in the band boundary area of the boundary shingled recording band area SBA. In addition, the magnetic disk device 1 counts the number of retries in two adjacent band boundary areas with the zone boundary of two zones that are adjacent in the radial direction interposed therebetween. When the number of retries in the band boundary areas exceeds a refresh threshold corresponding to the band boundary areas, the magnetic disk device 1 executes refresh processing in the band boundary areas. Therefore, the magnetic disk device 1 can improve reliability.

Third Embodiment

The magnetic disk device 1 of a third embodiment differs from the magnetic disk device 1 of the first embodiment, the second embodiment, and the modification example in the write processing.

The recording area management unit 620 sets, for example, the entire area of the user data area 10*a* of the disk 10 as the shingled recording band area SBA.

For example, when the recording area management unit 620 sets the entire area of the user data area 10*a* of the disk 10 as the shingled recording band area SBA, the read/write control unit 610 writes a boundary band track in a band boundary area of each shingled recording band area SBA of the user data area 10*a*. The read/write control unit 610 writes the first boundary area band track at a boundary track pitch in the forward direction from the boundary band track in the band boundary area of each shingled recording band area SBA. The read/write control unit 610 writes at least one boundary area band track from the first boundary area band track to the last boundary area band track at the boundary track pitch in the forward direction in the band boundary area of each shingled recording band area SBA. The read/write control unit 610 writes the start track at a boundary track pitch in the forward direction from the last boundary area band track in the non-band boundary area of each shingled recording band area SBA.

The read/write control unit 610 executes shingled recording of a plurality of tracks from the start track to the last track at the shingled recording track pitch in the forward direction in the non-band boundary area of each shingled recording band area SBA. The read/write control unit 610 writes the first boundary area band track at a boundary track pitch in the forward direction from the last track in the band boundary area of each shingled recording band area SBA. The read/write control unit 610 writes at least one boundary area band track from the first boundary area band track to the last boundary area band track at the boundary track pitch in the forward direction in the band boundary area of each shingled recording band area SBA. The read/write control unit 610 writes a boundary band track at a boundary track pitch in the forward direction from the last boundary area band track in the band boundary area of each shingled recording band area SBA.

For example, when the recording area management unit 620 sets the entire area of the user data area 10*a* of the disk 10 as the shingled recording band area SBA, the read/write control unit 610 writes a boundary band track in a band boundary area of the shingled recording band area SBA. The read/write control unit 610 writes the start track at a boundary track pitch in the forward direction from the boundary band track in the non-band boundary area of each shingled recording band area SBA. The read/write control unit 610 executes shingled recording of a plurality of tracks from the start track to the last track at the shingled recording track pitch in the forward direction in the non-band boundary area of each shingled recording band area SBA. The read/write control unit 610 writes a boundary band track at a boundary track pitch from the last track in the band boundary area of each shingled recording band area SBA.

When the recording area management unit 620 sets the entire area of the user data area 10*a* of the disk 10 as the shingled recording band area SBA, the write retry counter 630 counts the number of retries in the outermost band boundary area of a predetermined shingled recording band area SBA and the number of retries in the innermost band boundary area of the shingled recording band area SBA. In other words, when the recording area management unit 620 sets the entire area of the user data area 10*a* of the disk 10 to the shingled recording band area SBA, the write retry counter 630 counts the number of retries in the band boundary areas (that is, the innermost band boundary area and the outermost band boundary area) of these shingled recording band areas SBA that are adjacent in the radial direction with the band boundary BB between two shingled recording band areas SBA that are adjacent in the radial direction interposed therebetween.

For example, when the recording area management unit 620 sets the entire area of the user data area 10*a* of the disk 10 as the shingled recording band area SBA, the write retry counter 630 counts the number of retries of the outermost band track and the number of retries of the innermost band track in each shingled recording band area. In other words, the write retry counter 630 counts the number of retries of boundary band tracks of two shingled recording band areas SBA that are adjacent in the radial direction with the band boundary BB in the radial direction interposed therebetween.

Figure 20:
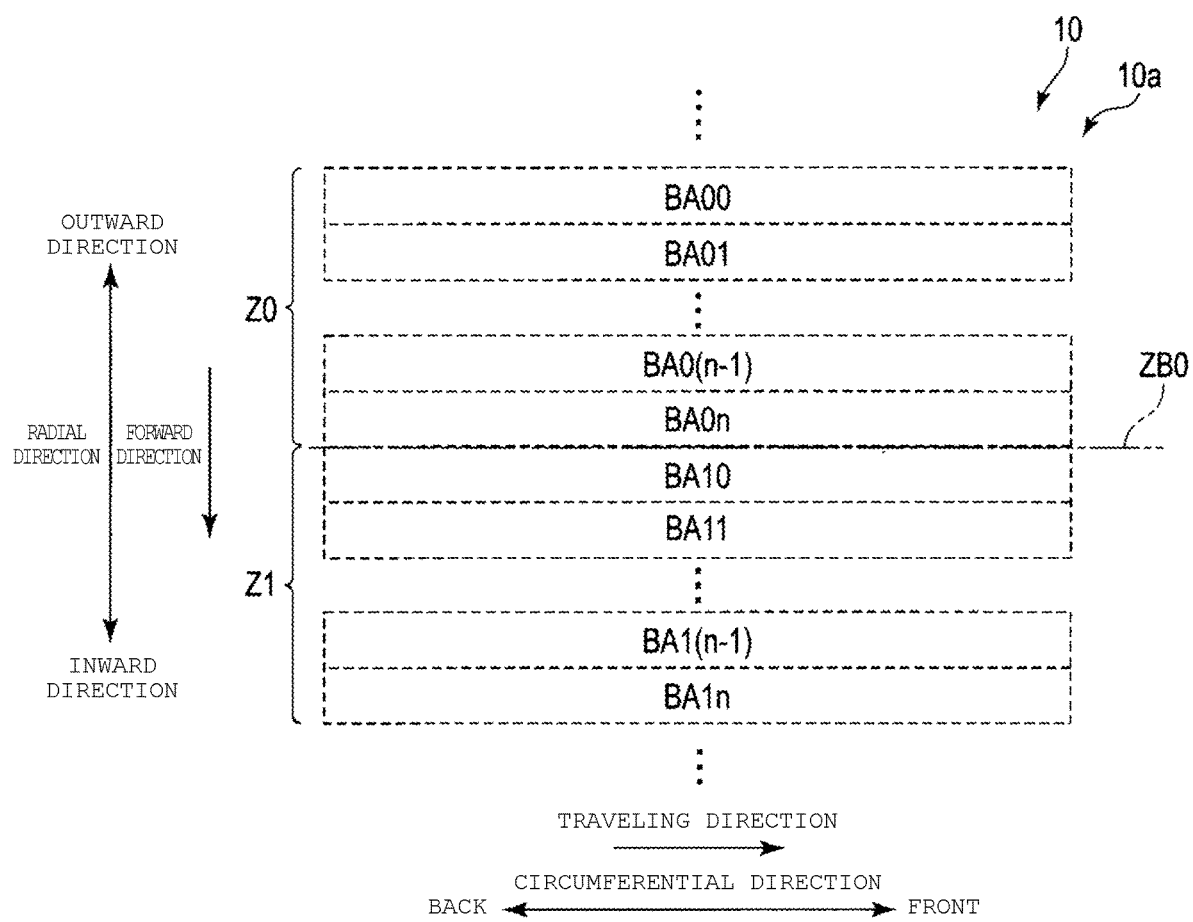
FIG. 20 is a schematic diagram illustrating an arrangement of zones.

FIG. 20 is a schematic diagram illustrating an arrangement of zones. FIG. 20 illustrates zones Z0 and Z1 that are adjacent in the radial direction. FIG. 20 illustrates a zone boundary ZB0 between the zones Z0 and Z1. The zone Z0 includes band areas BA00, BA01, . . . , BA0(*n*−1), and BA0*n*. The band areas BA00, BA01, . . . , BA0(*n*−1), and BA0*n* are arranged in the stated order from the outside to the inside. For example, in the zone Z0, the band areas BA00 to BA0*n* each correspond to the shingled recording band area SBA. In FIG. 20, the band area BA0*n* corresponds to the zone boundary band area BA0*n*. The zone Z1 includes band areas BA10, BA11, . . . , BA1(*n*−1), and BA1*n*. The band areas BA10, BA11, . . . , BA1(*n*−1), and BA1*n* are arranged in the stated order from the outside to the inside. For example, in the zone Z1, the band areas BA10 to BA1*n* correspond to the shingled recording band area SBA, respectively. In FIG. 20, the band area BA10 corresponds to the zone boundary band area BA10.

In the example illustrated in FIG. 20, when the recording area management unit 620 sets the entire area of the user data area 10*a* of the disk 10 as the shingled recording band area SBA, the read/write control unit 610 writes each of the band areas BA00, BA01, . . . , BA0(*n*−1), and BA0*n* in the zone Z0, as illustrated in FIG. 4.

In the example illustrated in FIG. 20, when the recording area management unit 620 sets the entire area of the user data area 10*a* of the disk 10 as the shingled recording band area SBA, the read/write control unit 610 writes each of the band areas BA10, BA11, . . . , BA1(*n*−1), and BA1*n* in the zone Z1, as illustrated in FIG. 4.

FIG. 21 is a diagram illustrating a table TB2 for storing the number of retries according to the third embodiment. The table TB2 illustrated in FIG. 21 corresponds to, for example, FIG. 20. In FIG. 21, the table TB2 includes a zone, a band area, the number of retries of the innermost band track, and the number of retries of the outermost band track.

In the example illustrated in FIG. 21, when the write retry processing is executed a predetermined number of times, for example, five times, in the innermost band track of the shingled recording band area BA01, the write retry counter 630 increases the number of retries of the innermost band track of the shingled recording band area BA01 and the number of retries of the outermost band track of the shingled recording band area BA00 of the table TB1 by five.

In the example illustrated in FIG. 21, when the number of retries of the innermost track of the shingled recording band area BA01 exceeds a refresh threshold of the shingled recording band area BA01, the refresh control unit 640 executes refresh processing in the shingled recording band area BA01, and resets the number of retries of the innermost band track and the number of retries of the outermost band track of the shingled recording band area BA01, for example, to 0.

In the example illustrated in FIG. 21, when the write retry processing is executed a predetermined number of times in the innermost band track of the shingled recording band area BA0$n$, the write retry counter 630 increases the number of retries of the innermost band track of the shingled recording band area BA0$n$ and the number of retries of the outermost band track of the shingled recording band area BA0($n$−1) in the table TB1 by the predetermined number.

In the example illustrated in FIG. 21, when the number of retries of the innermost band track of the shingled recording band area BA0$n$ exceeds a refresh threshold of the shingled recording band area BA0$n$, the refresh control unit 640 executes refresh processing in the shingled recording band area BA0$n$, and resets the number of retries of the innermost band track and the number of retries of the outermost band track in the shingled recording band area BA0$n$, for example, to 0.

Figures 22, 23:
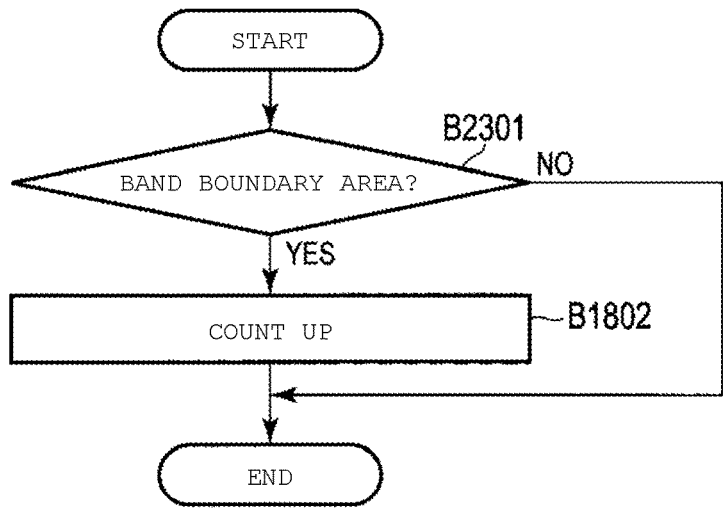
FIG. 22 is a diagram illustrating a table TB2 for storing the number of retries according to a third embodiment.
FIG. 23 is a flowchart of processing of counting the number of retries according to a third embodiment.

FIG. 22 is a schematic diagram illustrating the table TB2 when a reset write pointer is received or a media conversion is executed. The table TB2 illustrated in FIG. 22 corresponds to the table TB2 illustrated in FIG. 21.

In the example illustrated in FIG. 22, when a reset write pointer is received for the inner boundary shingled recording band area BA00 or when a media conversion is performed, the write retry counter 630 resets the number of retries of the innermost band track and the number of retries of the outermost band track in the shingled recording band area BA00, for example, to 0.

FIG. 23 is a flowchart of processing of counting the number of retries according to the third embodiment.

The MPU 60 determines whether the area where a write retry has occurred is a band boundary area (B2301). For example, the MPU 60 determines whether the area where a write retry has occurred is a boundary band track. When it is determined that the area where a write retry has occurred is not a band boundary area (NO in B2301), the MPU 60 ends the processing. For example, when it is determined that the area where the write retry has occurred is not a boundary band track, the MPU 60 ends the processing. When it is determined that the area where a write retry has occurred is a band boundary area (YES in B2301), the MPU 60 counts up the number of retries in the area where the write retry has occurred, for example, increments the number of retries in the area where the retry has occurred (B1802), and ends the processing. For example, when it is determined that the area where a write retry has occurred is a boundary band track, the MPU 60 counts up the number of retries in the area where the retry has occurred and ends the processing.

According to the third embodiment, the magnetic disk device 1 writes a boundary band track in the band boundary area of the shingled recording band area SBA. The magnetic disk device 1 writes a start track at a predetermined distance in the forward direction from the boundary band track in the non-band boundary area of the shingled recording band area SBA. The magnetic disk device 1 executes recording of a plurality of tracks from the start track to the last track in the non-band boundary area of the shingled recording band area SBA in the forward direction at the shingled recording track pitch. The magnetic disk device 1 writes a boundary band track at a predetermined distance from the last track in the band boundary area of the shingled recording band area SBA. In addition, the magnetic disk device 1 counts the number of retries in two adjacent band boundary areas with the band boundary of two band areas that are adjacent in the radial direction interposed therebetween. When the number of retries in the band boundary areas exceeds a refresh threshold corresponding to the band boundary areas, the magnetic disk device 1 executes refresh processing in the band boundary areas. Therefore, the magnetic disk device 1 can improve reliability.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A magnetic disk device, comprising:
   a disk including a plurality of areas divided in a radial direction;
   a head; and
   a controller configured to control the head to write data to
      a first area according to a normal recording format such that a plurality of tracks in the first area are separated from each other, and a second area according to a modified shingled recording format such that at least two adjacent tracks in the second area partially overlap, wherein
   a first distance between track centers of said two adjacent tracks in the radial direction is different from a second distance between track centers of a first track in the second area that is at one end of the second area in the radial direction and a second track in the second area that is adjacent to the first track in the radial direction.

2. The magnetic disk device according to claim 1, wherein the first track is at an outermost end of the second area in the radial direction.

3. The magnetic disk device according to claim 2, wherein said at least two adjacent tracks include a third and a fourth track, each of which is at neither the outermost end nor an innermost end of the second area in the radial direction.

4. The magnetic disk device according to claim 3, wherein
   the second area further includes a fifth track and a sixth track adjacent to the fifth track, the sixth track being located at the innermost end of the second area, and
   a track center of the fifth track is separated from a track center of the sixth track by the second distance in the radial direction.

5. The magnetic disk device according to claim 4, wherein the first and the second track do not overlap.

6. The magnetic disk device according to claim 5, wherein the fifth and the sixth track do not overlap.

7. The magnetic disk device according to claim 4, wherein a distance between track centers of any two adjacent tracks between the first and sixth tracks is identical with the first distance.

8. The magnetic disk device according to claim 4, wherein the controller is further configured to count a first number of write retries for the first track and a second number of write retries for the sixth track.

9. The magnetic disk device according to claim 8, wherein the controller is further configured to rewrite data that has been stored in the second area, when either the first number of write retries or the second number of write retries exceeds a threshold.

10. The magnetic disk device according to claim 1, wherein
the controller is further configured to control the head to write data to a plurality of second areas according to the modified shingled recording format, and
a distance between track centers of an outermost track of each second area and a track adjacent thereto is equal to a distance between track centers of an innermost track of each second area and a track adjacent thereto, but is different from a distance between track centers of any other adjacent tracks other than the outermost and innermost tracks.

11. A method for writing data to a magnetic disk, the method comprising:
writing data to a first area of the magnetic disk according to a normal recording format such that a plurality of tracks are separated from each other;
writing data to a second area of the magnetic disk according to a modified shingled recording format such that at least two adjacent tracks partially overlap, wherein
a first distance between track centers of said two adjacent tracks in the radial direction is different from a second distance between track centers of a first track in the second area that is at one end of the second area in the radial direction and a second track in the second area that is adjacent to the first track in the radial direction.

12. The method according to claim 11, wherein the first track is at an outermost end of the second area in the radial direction.

13. The method according to claim 12, wherein said at least two adjacent tracks include a third and a fourth track, each of which is at neither the outermost end nor an innermost end of the second area in the radial direction.

14. The method according to claim 13, wherein
the second area further includes a fifth track and a sixth track adjacent to the fifth track, the sixth track being at the innermost end of the second area, and
a track center of the fifth track is separated from a track center of the sixth track by the second distance in the radial direction.

15. The method according to claim 14, wherein the first and the second track do not overlap.

16. The method according to claim 15, wherein the fifth and the sixth track do not overlap.

17. The method according to claim 14, wherein a distance between track centers of any two adjacent tracks between the first and sixth tracks is identical with the first distance.

18. The method according to claim 14, further comprising:
counting a first number of write retries occurred in the first track and a second number of write retries occurred in the sixth track.

19. The method according to claim 18, further comprising:
rewriting data that has been stored in the second area when either the first number of write retries or the second number of write retries exceeds a threshold.

20. The method according to claim 11, further comprising:
writing data to a plurality of second areas according to the modified shingled recording format, wherein
a distance between track centers of an outermost track of each second area and a track adjacent thereto is equal to a distance between track centers of an innermost track of each second area and a track adjacent thereto, but is different from a distance between track centers of any other adjacent tracks other than the outermost and innermost tracks.

* * * * *